(12) United States Patent
Sumita

(10) Patent No.: US 7,974,844 B2
(45) Date of Patent: Jul. 5, 2011

(54) APPARATUS, METHOD AND COMPUTER PROGRAM PRODUCT FOR RECOGNIZING SPEECH

(75) Inventor: Kazuo Sumita, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1158 days.

(21) Appl. No.: 11/712,412

(22) Filed: Mar. 1, 2007

(65) Prior Publication Data

US 2007/0225980 A1    Sep. 27, 2007

(30) Foreign Application Priority Data

Mar. 24, 2006 (JP) ................................. 2006-083762

(51) Int. Cl.
*G10L 15/00* (2006.01)
*G10L 15/18* (2006.01)

(52) U.S. Cl. ................. 704/257; 704/4; 704/9; 704/237

(58) Field of Classification Search ............... 704/4, 9, 704/237, 257
See application file for complete search history.

(56) References Cited

U.S. PATENT DOCUMENTS

| | | | | |
|---|---|---|---|---|
| 4,873,634 A * | 10/1989 | Frisch et al. | ............... | 715/257 |
| 5,170,349 A * | 12/1992 | Yagisawa et al. | ............... | 704/9 |
| 5,388,183 A * | 2/1995 | Lynch | ............... | 704/242 |
| 5,406,480 A * | 4/1995 | Kanno | ............... | 704/10 |
| 5,712,957 A * | 1/1998 | Waibel et al. | ............... | 704/240 |
| 5,829,000 A * | 10/1998 | Huang et al. | ............... | 704/252 |
| 5,855,000 A * | 12/1998 | Waibel et al. | ............... | 704/235 |
| 5,864,805 A * | 1/1999 | Chen et al. | ............... | 704/235 |
| 5,920,836 A * | 7/1999 | Gould et al. | ............... | 704/251 |
| 6,064,959 A * | 5/2000 | Young et al. | ............... | 704/251 |
| 6,311,157 B1 * | 10/2001 | Strong | ............... | 704/255 |
| 6,418,410 B1 * | 7/2002 | Nassiff et al. | ............... | 704/251 |
| 6,513,005 B1 * | 1/2003 | Qin et al. | ............... | 704/254 |
| 6,532,444 B1 * | 3/2003 | Weber | ............... | 704/257 |

(Continued)

FOREIGN PATENT DOCUMENTS

JP    07-028489    1/1995

(Continued)

OTHER PUBLICATIONS

Suhm, B., Myers, B., and Waibel, A. 1996. Interactive recovery from speech recognition errors in speech user interfaces. In Proceedings of the International Conference on Spoken Language Processing (Philadelphia, PA). 861-864.*

(Continued)

*Primary Examiner* — Richemond Dorvil
*Assistant Examiner* — Greg Borsetti
(74) *Attorney, Agent, or Firm* — Finnegan, Henderson, Farabow, Garrett & Dunner, L.L.P.

(57) ABSTRACT

A speech recognition apparatus includes a first-candidate selecting unit that selects a recognition result of a first speech from first recognition candidates based on likelihood of the first recognition candidates; a second-candidate selecting unit that extracts recognition candidates of a object word contained in the first speech and recognition candidates of a clue word from second recognition candidates, acquires the relevance ratio associated with the semantic relation between the extracted recognition candidates of the object word and the extracted recognition candidates of the clue word, and selects a recognition result of the second speech based on the acquired relevance ratio; a correction-portion identifying unit that identifies a portion corresponding to the object word in the first speech; and a correcting unit that corrects the word on identified portion.

19 Claims, 20 Drawing Sheets

U.S. PATENT DOCUMENTS

| | | | |
|---|---|---|---|
| 6,581,033 B1* | 6/2003 | Reynar et al. | 704/231 |
| 6,615,178 B1* | 9/2003 | Tajima | 704/277 |
| 6,912,498 B2* | 6/2005 | Stevens et al. | 704/235 |
| 7,124,081 B1* | 10/2006 | Bellegarda | 704/255 |
| 7,200,555 B1* | 4/2007 | Ballard et al. | 704/235 |
| 7,225,130 B2* | 5/2007 | Roth et al. | 704/270 |
| 7,243,069 B2* | 7/2007 | Jaepel et al. | 704/235 |
| 7,366,983 B2* | 4/2008 | Brill et al. | 715/257 |
| 7,383,172 B1* | 6/2008 | Jamieson | 704/9 |
| 7,421,387 B2* | 9/2008 | Godden | 704/200 |
| 7,493,257 B2* | 2/2009 | Kim et al. | 704/240 |
| 7,742,921 B1* | 6/2010 | Davis et al. | 704/270 |
| 2002/0116194 A1* | 8/2002 | Lewis et al. | 704/257 |
| 2003/0200093 A1* | 10/2003 | Lewis et al. | 704/260 |
| 2003/0216912 A1 | 11/2003 | Chino | |
| 2004/0186714 A1* | 9/2004 | Baker | 704/236 |
| 2004/0249637 A1* | 12/2004 | Baker | 704/239 |
| 2005/0033574 A1* | 2/2005 | Kim et al. | 704/251 |
| 2005/0187767 A1* | 8/2005 | Godden | 704/238 |
| 2005/0203751 A1* | 9/2005 | Stevens et al. | 704/276 |
| 2005/0210383 A1* | 9/2005 | Cucerzan et al. | 715/533 |
| 2006/0015338 A1* | 1/2006 | Poussin | 704/251 |
| 2006/0111917 A1* | 5/2006 | Dhanakshirur | 704/277 |
| 2006/0129397 A1* | 6/2006 | Li et al. | 704/245 |
| 2006/0161434 A1* | 7/2006 | Faisman et al. | 704/246 |
| 2006/0190255 A1* | 8/2006 | Fukada | 704/251 |
| 2006/0293889 A1* | 12/2006 | Kiss et al. | 704/235 |
| 2007/0094066 A1* | 4/2007 | Kumar et al. | 705/10 |
| 2007/0094067 A1* | 4/2007 | Kumar et al. | 705/10 |
| 2007/0208567 A1* | 9/2007 | Amento et al. | 704/270 |
| 2008/0103760 A1* | 5/2008 | Kirshenbaum | 704/9 |

FOREIGN PATENT DOCUMENTS

| | | |
|---|---|---|
| JP | 11-338493 | 12/1999 |
| JP | 2001-34287 | 2/2001 |
| JP | 2001-517815 | 10/2001 |
| JP | 2002-318596 | 10/2002 |
| JP | 2003-316384 | 11/2003 |
| JP | 2003-316386 | 11/2003 |
| JP | 2005-221752 | 8/2005 |

OTHER PUBLICATIONS

Machine translation of JP-11-338493A.*
Jeong et al. "Semantic-Oriented Error Correction for Spoken Query Processing" 2003.*
Sarma et al. "Context-based Speech Recognition Error Detection and Correction" 2004.*
Sumh et al. "Interactive Recovery From Speech Recognition Errors in Speech User Interfaces" 2002.*
Jeong et al. "Using higher-level linguistic knowledge for speech recognition error correction in a spoken Q/A dialog" 2004.*
Ogata et al. "Speech Repair: Quick Error Correction Just by Using Selection Operation for Speech Input Interfaces" Sep. 2005.*
Charlesworth et al. "SpokenContent Representation in MPEG-7" 2001.*
Lieberman et al. "How to Wreck a Nice Beach You Sing Calm Incense" Jan. 2005.*
Office Action mailed by Japanese Patent Office on Jun. 22, 2010, in Japanese patent application No. 2006-083762 and partial English translation thereof.

* cited by examiner

| WORD | PHONEME STRING | APPEARANCE PROBABILITY |
|---|---|---|
| 7時 | shichiji | 0.020 |
| 1時 | ichiji | 0.015 |
| 一字 | ichiji | 0.005 |
| 要約 | yo-yaku | 0.010 |
| ようやく | yo-yaku | 0.005 |
| 予約 | yoyaku | 0.020 |

FIG.9

| FIRST WORD | SECOND WORD | APPEARANCE PROBABILITY |
|---|---|---|
| 予約<br>(yoyaku) | の<br>(no) | 0.03 |
| 要約<br>(yoyaku) | の<br>(no) | 0.01 |

| FIRST WORD | SECOND WORD | CO-OCCURRENCE PROBABILITY |
|---|---|---|
| おいしい (oishii) | コーヒー (kouhii) | 0.7 |
| 熱い (atsui) | コーヒー (kouhii) | 0.6 |
| 暑い (atsui) | コーヒー (kouhii) | 0.1 |

APPARATUS, METHOD AND COMPUTER PROGRAM PRODUCT FOR RECOGNIZING SPEECH

CROSS-REFERENCE TO RELATED APPLICATIONS

This application is based upon and claims the benefit of priority from the prior Japanese Patent Application No. 2006-83762, filed on Mar. 24, 2006; the entire contents of which are incorporated herein by reference.

BACKGROUND OF THE INVENTION

1. Field of the Invention

The present invention relates to an apparatus, a method and a computer program product for recognizing a speech by converting speech signals into character strings.

2. Description of the Related Art

Recently, human interface technologies based on speech input have been brought into practical use. For example, there is a speech-based operation system that enables a user to operate the system by vocalizing one of predetermined commands. The system recognizes the speech command and performs a corresponding operation. Another example is a system that analyzes any sentence vocalized by the user and converts the sentence into a character string, whereby producing a document from a speech input.

Technologies of speech-based interaction between a robot and a user are also actively studied and developed. Researchers are trying to instruct the robot to perform a certain action or access many kinds of information via the robot based on the speech input.

Such systems use a speech recognition technology of converting speech signals to digital data and comparing the data with predetermined patterns.

With speech recognition technologies, the speeches are subjected to be incorrectly recognized due to the effect of environmental noise, quality and volume of the user's voice, speed of the speech, and the like. It is difficult to correctly recognize dialects unless the spoken word is included in a word dictionary in the system. Furthermore, incorrect recognition can be caused by insufficient speech data and text corpus that are used to create features, probabilities, and the like included in standard patterns, word networks, language models and the like. The incorrect recognition can also be caused by deletion of correct words due to restricted number of candidates to reduce the computing load, and by incorrect pronunciation or rewording by the user.

Because the incorrect recognition can be caused by various factors, the user needs to change the incorrect portions to correct character strings by any means. One of the most reliable and simple approach is use of a keyboard, a pen device, or the like; however, use of such devices offsets the hands free feature that is an advantage of the speech input. Moreover, if the user can use the devices, the speech input is not required at all.

Another approach is to correct the incorrect portions by the user vocalizing the sentence again; however, it is difficult to prevent recurrence of the incorrect recognition only by rewording the same sentence, and it is stressful for the user to repeat a long sentence.

To solve the problem, JP-A H11-338493 (KOKAI) and JP-A 2003-316386 (KOKAI) disclose technologies of correcting an error by vocalizing only a part of the speech that was incorrectly recognized. According to the technologies, time-series feature of a first speech is compared with time-series feature of a second speech that was spoken later for correction, and a portion in the first speech that is similar to the second speech is detected as an incorrect portion. The character string corresponding to the incorrect portion in the first speech is deleted from candidates of the second speech to select the most probable character string for the second speech, whereby realizing more reliable recognition.

However, the technologies disclosed in JA-A H11-338493 (KOKAI) and JP-A 2003-316386 (KOKAI) are disadvantageous in that the incorrect recognition is likely to recur when there are homophones or similarly pronounced words.

For example, in Japanese language, there are often a lot of homophones for a single pronunciation. Furthermore, there are often a lot of words that are similarly pronounced.

When there are a lot of the homophones and similarly pronounced words, a suitable word could not be selected from such words with the speech recognition technologies, and thus the word recognition was not very accurate.

For this reason, in the technologies disclosed in JA-A H11-338493 (KOKAI) and JP-A 2003-316386 (KOKAI), the user needs to repeat vocalizing the same sound until the correct result is output, increasing the load of correcting process.

SUMMARY OF THE INVENTION

According to one aspect of the present invention, a speech recognition apparatus includes a semantic-relation storage unit that stores semantic relation among words and relevance ratio indicating degree of the semantic relation in association with each other; a first input accepting unit that accepts an input of a first speech; a first candidate producing unit that recognizes the first speech and produces first recognition candidates and first likelihood of the first recognition candidates; a first-candidate selecting unit that selects one of the first recognition candidates as a recognition result of the first speech based on the first likelihood of the first recognition candidates; a second input accepting unit that accepts an input of a second speech including an object word and a clue word, the object word is contained in the first recognition candidates, the clue word that provides a clue for correcting the object word; a second candidate producing unit that recognizes the second speech and produces second recognition candidates and second likelihood of the second recognition candidates; a word extracting unit that extracts recognition candidates of the object word and recognition candidates of the clue word from the second recognition candidates; a second-candidate selecting unit that acquires the relevance ratio associated with the semantic relation between the extracted recognition candidates of the objected word and the extracted recognition candidates of the clue word, from the semantic-relation storage unit, and selects one of the second recognition candidates as a recognition result of the second speech based on the acquired relevance ratio; a correction-portion identifying unit that compares the recognition result of the first speech with the recognition result of the second speech, and identifies a portion corresponding to the object word; and a correcting unit that corrects the identified portion corresponding to the object word.

According to another aspect of the present invention, a speech recognition method includes accepting a first speech; recognizing the accepted first speech to produce first recognition candidates and first likelihood of the first recognition candidates; selecting one of the first recognition candidates produced for a first speech as the recognition result of the first speech based on the first likelihood of the first recognition candidates; accepting a second speech that includes a object word and a clue word, the object word is contained in the first recognition candidates, the clue word that provides a clue for correcting the object word; recognizing the accepted second speech to produce second recognition candidates and second likelihood of the second recognition candidates; extracting recognition candidates of the object word and recognition candidates of the clue word from the produced second recognition candidates; acquiring a relevance ratio associated with the semantic relation between the extracted recognition candidates of the object word and the extracted recognition candidates of the clue word from a semantic-relation storage unit that stores therein semantic relation among words and relevance ratio indicating degree of the semantic relation in association with each other; selecting one of the second recognition candidates as the recognition result of the second speech based on the acquired relevance ratio; comparing the recognition result of the first speech with the recognition result of the second speech; identifying a portion corresponding to the object word in the first speech; and correcting the identified portion corresponding to the object word.

A computer program product according to still another aspect of the present invention causes a computer to perform the method according to the present invention.

BRIEF DESCRIPTION OF THE DRAWINGS

FIG. 9 is a view showing an example of data configuration of a language model stored in a language model storage unit;

DETAILED DESCRIPTION OF THE INVENTION

Exemplary embodiments of the present invention are explained below in detail referring to the accompanying drawings. The present invention is not limited to the embodiments explained below.

A speech recognition apparatus according to a first embodiment of the present invention accurately recognizes a speech that is vocalized by a user to correct an incorrectly recognized speech recognition by referring to semantic restriction information assigned to a character string corrected by the user.

Figure 1:
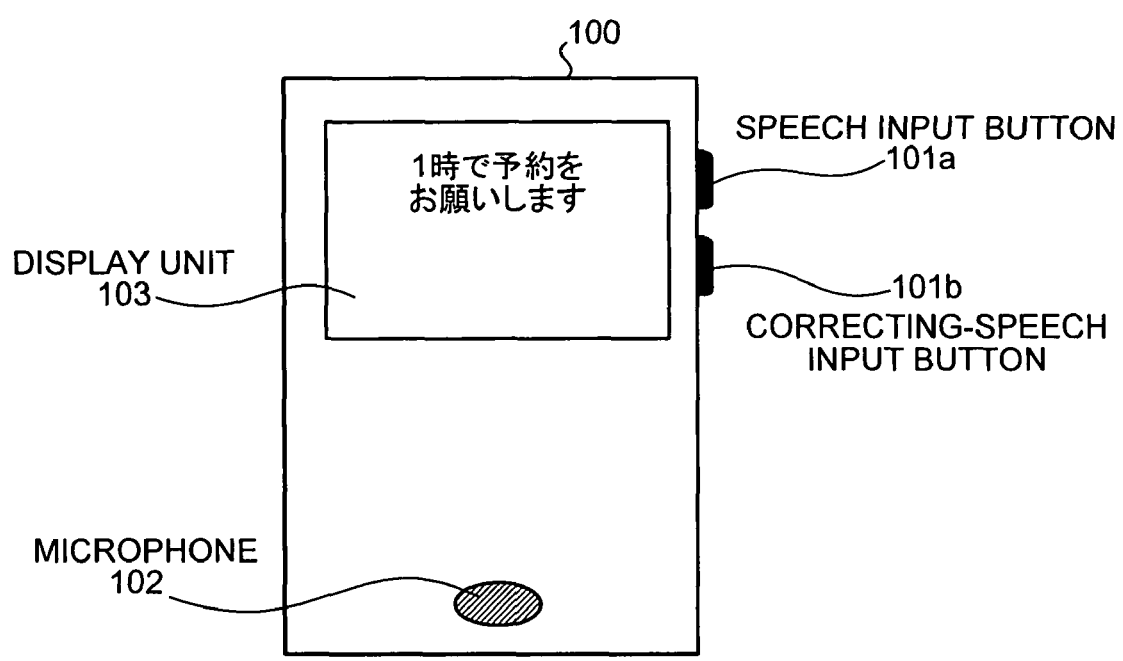
FIG. 1 is a schematic view of a speech recognition apparatus according to a first embodiment of the present invention.

FIG. 1 is a schematic view of a speech recognition apparatus 100 according to the first embodiment. The speech recognition apparatus 100 includes a speech input button 101a, a correcting-speech input button 101b, a microphone 102, and a display unit 103. The speech input button 101a is pressed by the user to input a speech. The correcting-speech input button 101b is pressed by the user to input a speech for correction when the character string recognized from the speech includes an error. The microphone 102 accepts the speech vocalized by the user in the form of electrical signals. The display unit 103 displays the character string indicating words recognized as the speech input by the user.

Figure 2:
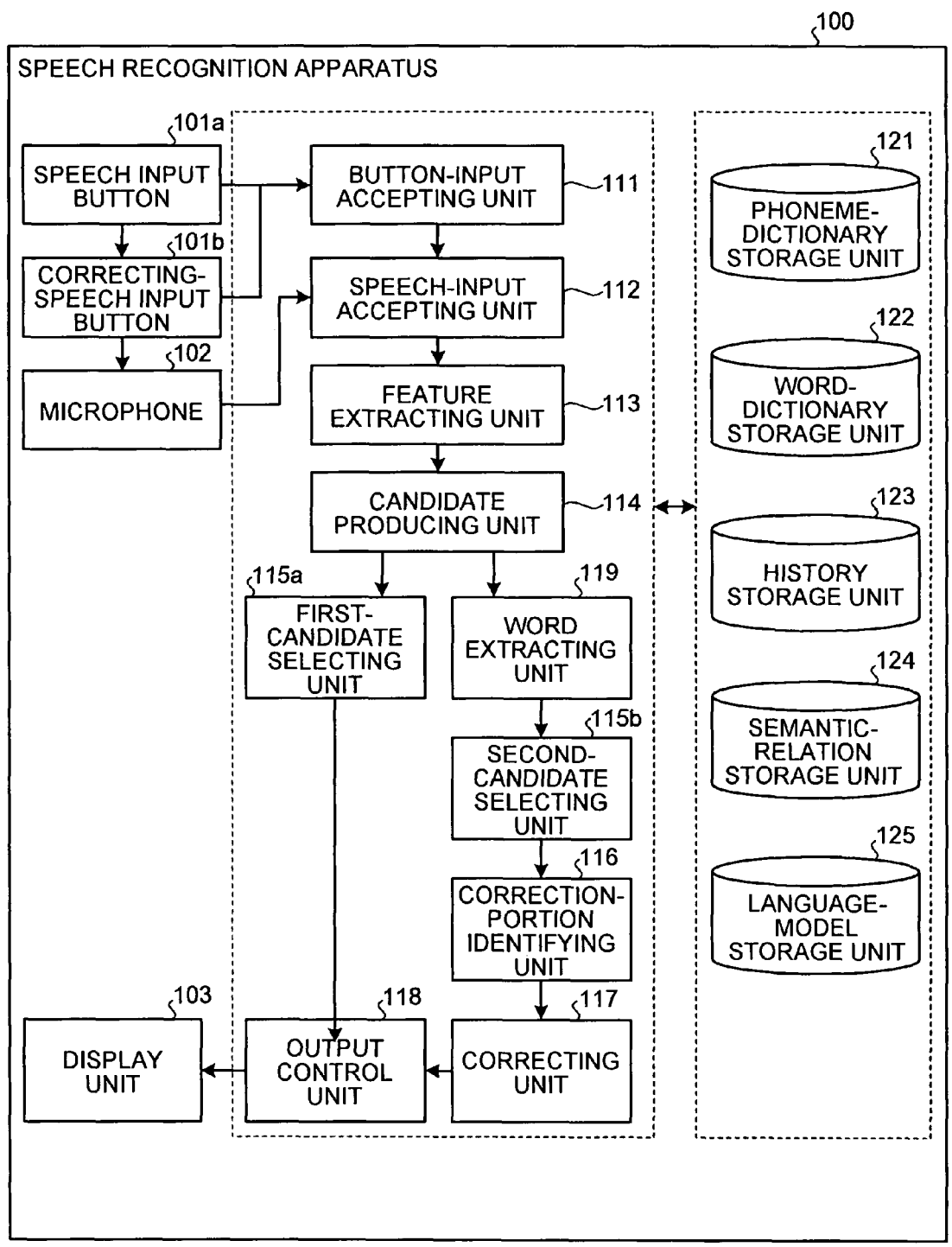
FIG. 2 is a block diagram of the speech recognition apparatus shown in FIG. 1.

FIG. 2 is a block diagram of the speech recognition apparatus 100 according to the first embodiment. The speech recognition apparatus 100 includes hardware such as a phoneme-dictionary storage unit 121, a word-dictionary storage unit 122, a history storage unit 123, a semantic-relation storage unit 124, and a language-model storage unit 125 in addition to the speech input button 101a, the correcting-speech input button 101b, the microphone 102, and the display unit 103.

The speech recognition apparatus 100 further includes software such as a button-input accepting unit 111, a speech-input accepting unit 112, a feature extracting unit 113, a candidate producing unit 114, a first-candidate selecting unit 115a, a second-candidate selecting unit 115b, a correction-portion identifying unit 116, a correcting unit 117, and an output control unit 118, and a word extracting unit 119.

The phoneme-dictionary storage unit 121 stores therein a phoneme dictionary including standard patterns of feature data of each phoneme. The phoneme dictionary is similar to dictionaries generally used in a typical speech recognition process based on Hidden Markov Model (HMM), and includes time-series features associated with each phonetic label. The time-series features can be compared in the same manner as with the time-series features output by the feature extracting unit 113 to be described later.

Figures 3, 4:
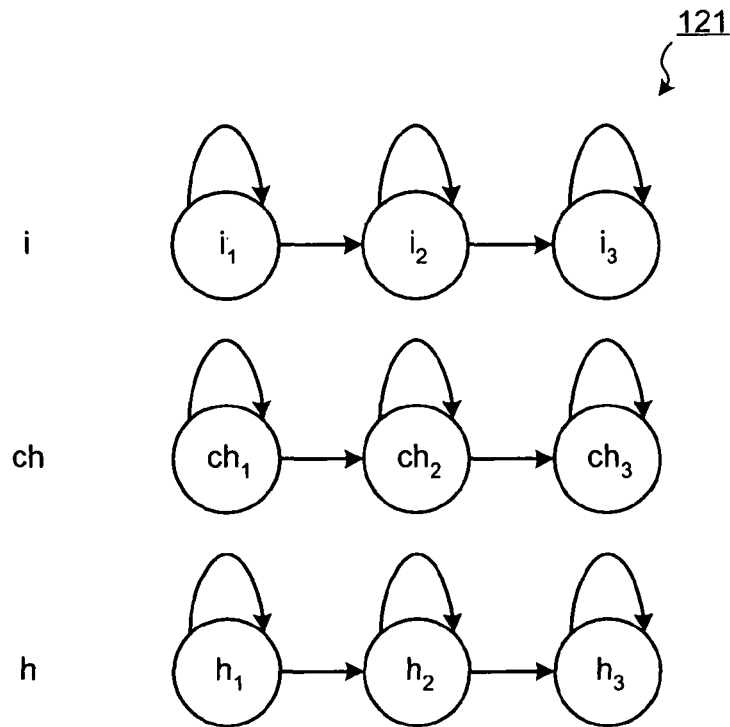
FIG. 3 is a view showing an example of a data configuration of a phoneme dictionary stored in a phoneme dictionary storage unit.
FIG. 4 is a view showing an example of a data configuration of a word dictionary stored in a word dictionary storage unit.

FIG. 3 is a view showing an example of a data configuration of the phoneme dictionary stored in the phoneme-dictionary storage unit 121. As shown in FIG. 3, the phoneme dictionary indicates each of the time-series features in the form of finite automaton that includes nodes and directed links.

Each node expresses the status of the collation. For example, the nodes i1, i2, and i3 corresponding to the phoneme "i" indicate different statuses. Each directed link is associated with a feature (not shown) that is a subelement of the phoneme.

The word-dictionary storage unit 122 stores therein a word dictionary including word information to be compared with the input speech. The word dictionary is similar to the dictionaries used in the HMM-based speech recognition process, includes phoneme strings corresponding to each word in advance, and is used to find a word corresponding to each phoneme string obtained by collation based on the phoneme dictionary.

FIG. 4 is a view showing an example of a data configuration of the word dictionary stored in the word-dictionary storage unit 122. The word dictionary stores therein the words, the phoneme strings that form each of the words, and probabilities of appearance of the words, associated with one another.

The appearance probability is used when the second-candidate selecting unit 115*b* determines the result of recognizing the speech input for correction, which is a value computed in advance based on a huge amount of speech data and text corpus.

The history storage unit 123 stores therein many kinds of interim data output during the speech recognition process. The interim data includes phoneme-string candidate groups indicating phoneme string candidates selected by referring to the phoneme dictionary and word-string candidate groups indicating word string candidates selected by referring to the word dictionary.

Figure 5:
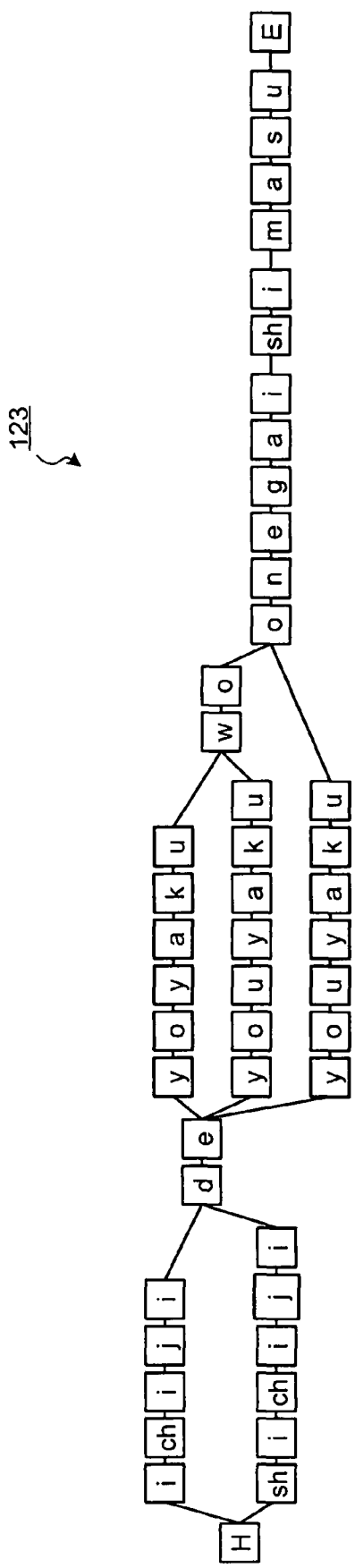
FIG. 5 is a view showing an example of a data format of a phoneme-string candidate group stored in a history storage unit.

FIG. 5 is a view showing an example of a data format of the phoneme-string candidate group stored in the history storage unit 123. As shown in FIG. 5, the phoneme string candidates are expressed in the form of a lattice structure. An "H" indicates a head node and an "E" indicates an end node of the lattice structure, neither of which includes any corresponding phoneme or word.

For the first part of the speech, a-phoneme string of "ichiji" that means one o'clock in Japanese and another phoneme string "shichiji" that means seven o'clock in Japanese are output as candidates.

Figure 6:
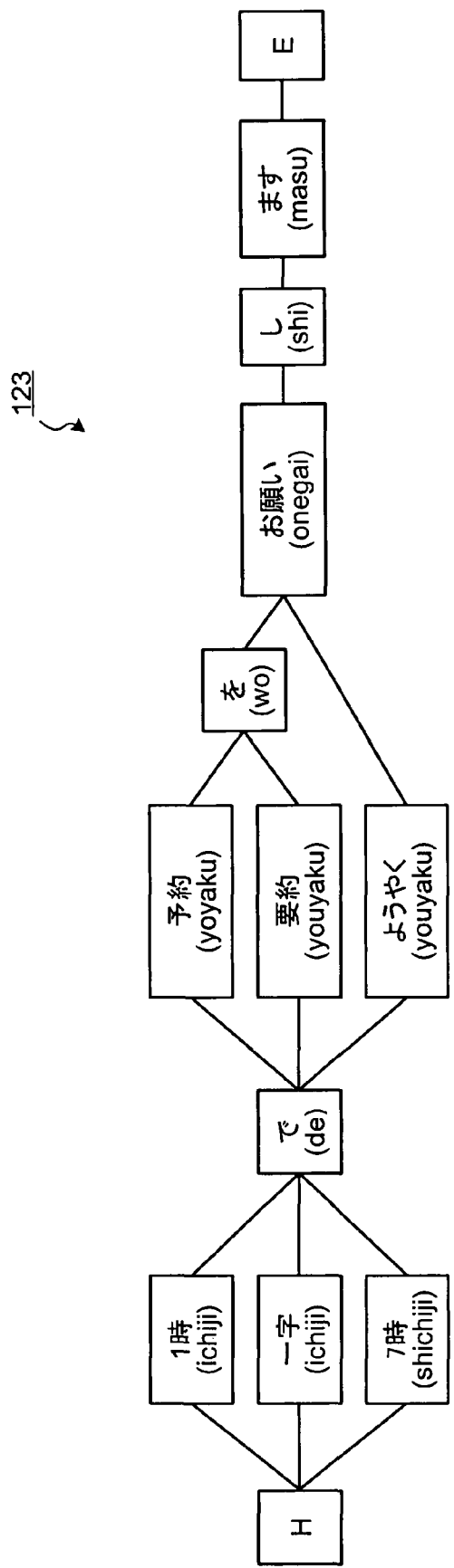
FIG. 6 is a view showing an example of a data format of word-string candidate group stored in a history storage unit.

FIG. 6 is a view showing an example of a data format of the word-string candidate group stored in the history storage unit 123. As shown in FIG. 6, the word string candidates are also expressed in the form of the lattice structure. The "H" indicates the head node and the "E" indicates the end node of the lattice structure.

For the first part of the speech, words including "ichiji" that means one o'clock in Japanese, "ichiji" that means a single letter in Japanese, and "shichiji" that means seven o'clock in Japanese are output as candidates.

Although not shown in the phoneme-string candidate group and the word-string candidate group in FIGS. 5 and 6, a level of similarity with the corresponding part of the speech is also stored in association with the node corresponding to each phoneme or word. In other words, each node is associated with the similarity level that is the likelihood indicating the probability of the node for the speech.

The semantic-relation storage unit 124 stores therein semantic relation among the words and level of the semantic relation associated with each other, and can take a form of a thesaurus in which the conceptual relations among the words are expressed in hierarchical structures.

Figure 7:
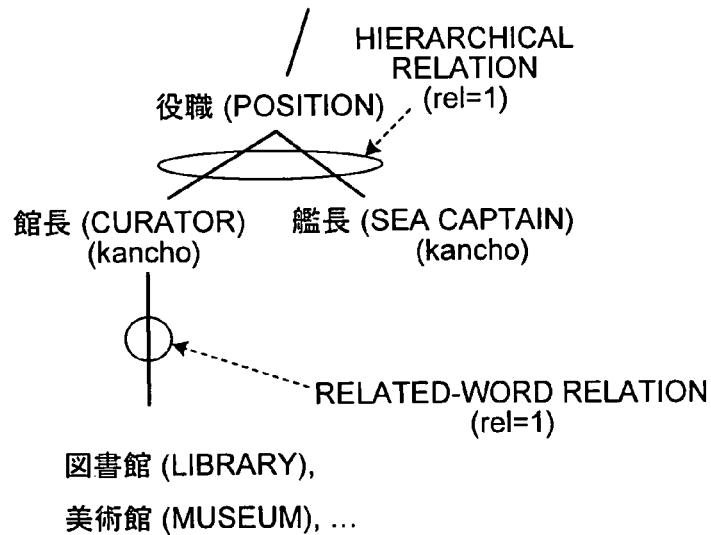
FIGS. 7 and 8 are views showing hierarchy diagrams for explaining relations among words.

FIG. 7 is a hierarchy diagram for explaining relations among the words. In FIG. 7, "LIBRARY", "MUSEUM", and the like are associated with "CURATOR" as related words. "CURATOR" and "SEA CAPTAIN" are semantically associated with "POSITION" under hierarchical notion.

A relevance ratio (rel) is assigned to each of the semantic relations. The value of "rel" is no less than zero and no more than one, and a larger value indicates a higher degree of the relation.

The semantic relation also includes any relations of synonyms, quasi-synonyms, and the like listed in a typical thesaurus. The hierarchical structures of the relations are actually stored in the semantic-relation storage unit 124 in the form of a table and the like.

Figure 8:
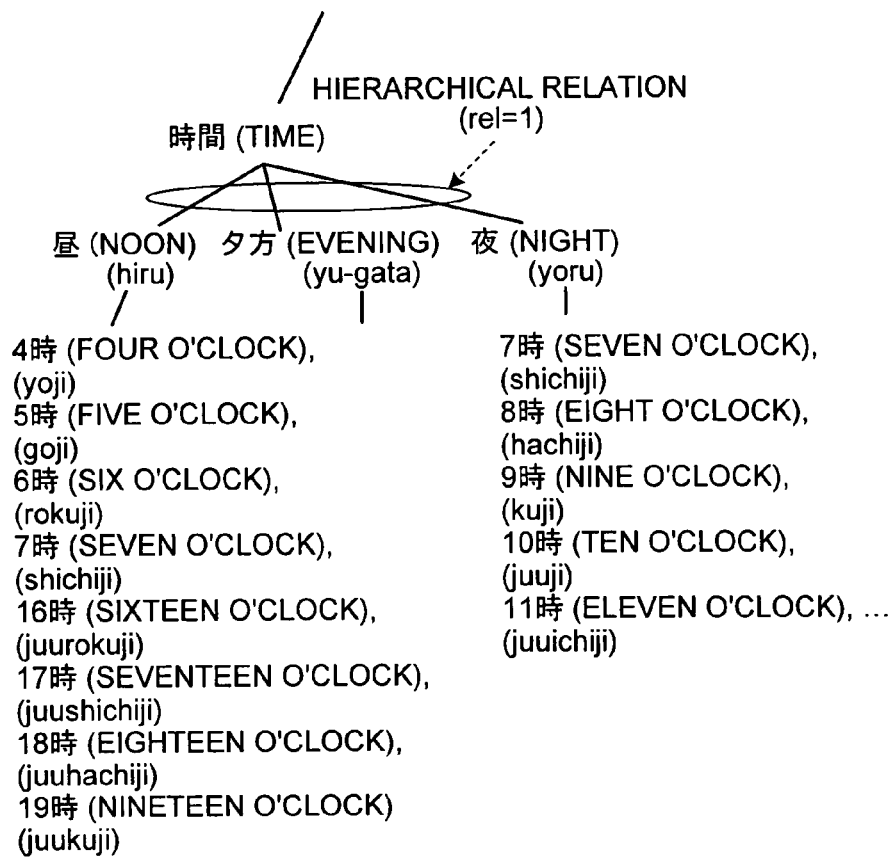

FIG. 8 is another hierarchy diagram for explaining relations among the words. In FIG. 8, "NOON", "EVENING", and "NIGHT" are semantically associated with "TIME" under the hierarchical notion. Moreover, "FOUR O'CLOCK", "FIVE O'CLOCK", "SIX O'CLOCK", "SEVEN O'CLOCK" and so on are semantically associated with "EVENING" under the hierarchical notion.

The language-model storage unit 125 stores therein language models that include the connection relation among words and the degree of the relation associated with each other. The language model is similar to the models used in the HMM-based speech recognition process, and used to select the most probable word string from the interim data.

FIG. 9 is a view showing an example of the data configuration of the language model stored in the language-model storage unit 125. In FIG. 9, the language model is based on a bi-gram that focuses on a relation between two words, and an appearance probability that the two words appear in succession is used as the degree of the connection relation.

The language model associates the two words (a first word and a second word) with the appearance probability. The appearance probability is computed in advance by analyzing the huge amount of text corpus. The language model is not limited to the bi-gram, and the language model can be based on a tri-gram that focuses on the relation among three words and the like.

The phoneme-dictionary storage unit 121, the word-dictionary storage unit 122, the history storage unit 123, the semantic-relation storage unit 124, and the language-model storage unit 125 can take a form of any common recording medium such as a hard disk drive (HDD), an optical disk, a memory card, a random access memory (RAM), and the like.

The button-input accepting unit 111 accepts operations of pressing and releasing of the speech input button 101*a* and the correcting-speech input button 101*b*, whereby accepting a specified start point and end point of a part of the speech accepted by the speech-input accepting unit 112. More specifically, the button-input accepting unit 111 accepts time duration in which the speech input button 101*a* or the correcting-speech input button 101*b* is pressed for a time longer than a predetermined time. The speech is recognized during the time duration, whereby the speech recognition process can be performed based on so-called Push-to-Talk system.

The speech-input accepting unit 112 receives the speech input by the user from the microphone 102, converts it into electrical signals, and outputs the electrical signals to the feature extracting unit 113. More specifically, the speech-input accepting unit 112 converts the received speech into the electrical signals, performs an analog-digital (A/D) conversion on the electrical signals, and outputs digital data converted by pulse code modulation (PCM). The process can be performed in the same manner as the conventional digitalization of speech signals.

The speech accepted by the speech-input accepting unit 112 while the speech input button 101*a* is being pressed is referred to as a first speech. The speech input to correct the first speech and accepted by the speech-input accepting unit 112 while the correcting-speech input button 101b is being pressed is referred to as a second speech.

The feature extracting unit 113 extracts acoustic features of a speech for identifying phonemes by means of frequency spectral analysis based on fast Fourier transformation (FFT) performed on the digital data output from the speech-input accepting unit 112.

With the frequency spectral analysis, continued speech waveforms are divided at the very short time period, the features in the target time period are extracted, the time period of the analysis is sequentially shifted, and thereby the time-series features can be acquired. The feature extracting unit 113 can be performed by the extracting process using any of the conventional methods such as the linearity prediction analysis and cepstrum analysis as well as the frequency spectral analysis.

The candidate producing unit 114 produces a probable phoneme-string candidate group and a probable word-string candidate group for the first or second speech using the phoneme dictionary and the word dictionary. The candidate producing unit 114 can produce the candidates in the same manner as the conventional speech recognition process based on the HMM.

More specifically, the candidate producing unit 114 compares the time-series features extracted by the feature extracting unit 113 with the standard patterns stored in the phoneme dictionary, and shifts the status expressed by the node according to the corresponding directed link, whereby selecting more similar phonemic candidates.

It is difficult to select only one phoneme because the standard pattern registered in the phoneme dictionary is generally different from the actual speech input by the user. The candidate producing unit 114 produces no more than a predetermined number of the most similar phonemes assuming that the candidates will be narrowed down later.

Moreover, the candidate producing unit 114 can produce the candidates by deleting a word or a character string specified in the first speech from the recognized second speech as described in JP-A 2003-316386 (KOKAI).

The first-candidate selecting unit 115a selects the most probable word string for the first speech from the word-string candidate group for the first speech output from the candidate producing unit 114. The conventional HMM-based speech recognition technology can also be used in this process. The HMM-based technology uses the language model stored in the language-model storage unit 125 to select the most probable word string.

As described above, a language model is associated with the first word, the second word, and the appearance probability of the two words juncturally. Therefore, the first-candidate selecting unit 115a can compare the appearance probabilities of pairs of the words in the word-string candidate group for the first speech, and select a most probable pair of words that have the largest probability.

The word extracting unit 119 extracts a word for acquiring the semantic relations from the word-string candidate group for the second speech output from the candidate producing unit 114.

The second-candidate selecting unit 115b selects the most probable word string for the second speech from the word-string candidate group for the second speech output from the candidate producing unit 114. The second-candidate selecting unit 115b performs a simple process of examining relations with only adjacent segments using the thesaurus to select the word string. This is because a short phrase is input for correction and it is needless to assume examining a complicated sentence. This process can be realized by using Viterbi algorithm, which is a sort of dynamic programming.

More specifically, the second-candidate selecting unit 115b acquires the semantic relations among the words extracted by the word extracting unit 119 by referring to the semantic-relation storage unit 124, and selects a group of words that are the most strongly semantically related as the most probable word string. At this time, the second-candidate selecting unit 115b considers the probability of the language model in the language-model storage unit 125, the similarity to the second speech, and the appearance probability of the words stored in the word-dictionary storage unit 122 to select the most probable word string.

The correction-portion identifying unit 116 refers to the word string selected by the second-candidate selecting unit 115b and the first speech and the second speech stored in the history storage unit 123, and identifies a portion to be corrected (hereinafter, "correction portion") in the first speech. More specifically, the correction-portion identifying unit 116 at first selects a word present in an attentive area from each of the word string candidates for the second speech. The attentive area is where a modificand is present. In Japanese, the modificand is often a last word or a compound consisting of a plurality of nouns, which is regarded as the attentive area. In English, an initial word or compound is regarded as the attentive area because a modifier usually follows the modificand with a preposition such as "of" and "at" in between.

The correction-portion identifying unit 116 then acquires the phoneme-string candidate group for the second speech that corresponds to the attentive area from the history storage unit 123, and compares each of them to the phoneme-string candidate group for the first speech, whereby identifying the correction portion in the first speech.

The correcting unit 117 corrects a partial word string in the correction portion identified by the correction-portion identifying unit 116. More specifically, the correcting unit 117 corrects the first speech by replacing the correction portion of the first speech with the word string that corresponds to the attentive area of the second speech.

Moreover, the correcting unit 117 can replace the correction portion of the first speech with the word string that corresponds to the entire second speech.

The output control unit 118 controls the process of displaying the word string on the display unit 103 as a result of the recognition of the first speech output by the first-candidate selecting unit 115a. The output control unit 118 also displays the word string on the display unit 103 as a result of the correction by the correcting unit 117. The output control unit 118 is not limited to output the word strings to the display unit 103. The output control unit 118 can use an output method such as outputting a voice synthesized from the word string to a speaker (not shown), or any other method conventionally used.

Figure 10:
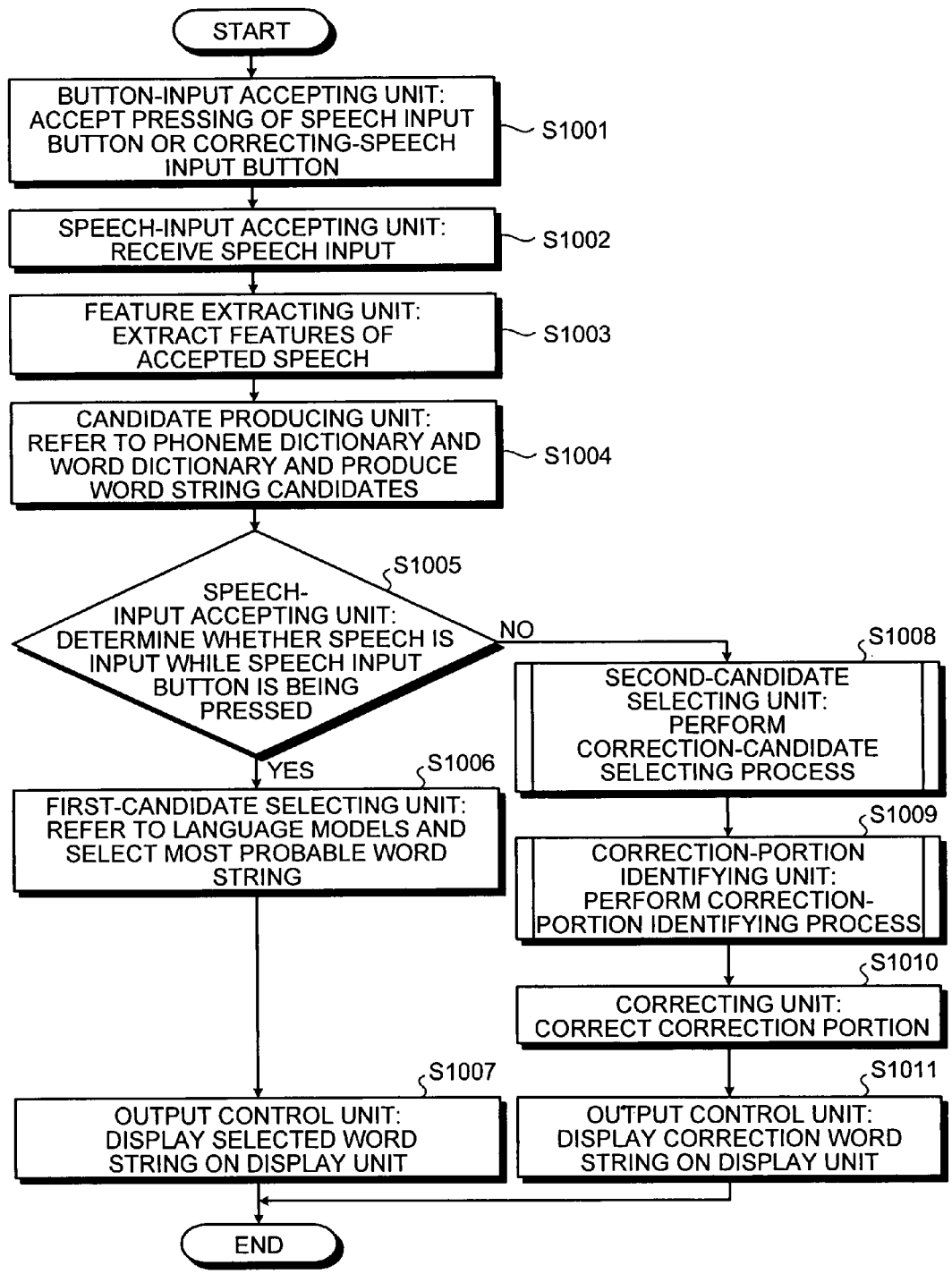
FIG. 10 is a flowchart of a speech recognition process according to the first embodiment.

Next, the above mentioned speech recognition process using the speech recognition apparatus 100 according to the first embodiment will be explained. FIG. 10 is a flowchart of an overall procedure in a speech recognition process according to the first embodiment.

First, the button-input accepting unit 111 accepts a pressing operation of the speech input button 101a or the correcting-speech input button 101b (step S1001).

Then, the speech-input accepting unit 112 receives the input of the first speech (step S1002). The feature extracting unit 113 extracts acoustic features of the first speech (step S1003) received by the speech-input accepting unit 112. The feature extracting unit 113 uses the frequency spectral analysis or the like to extract the acoustic features.

Next, the candidate producing unit 114 produces a probable word-string candidate group for the first speech by referring to the phoneme dictionary stored in the phoneme-dictionary storage unit 121 and the word dictionary stored in the word-dictionary storage unit 122 and comparing the extracted features with the standard patterns registered in the dictionaries (step S1004).

Then, the speech-input accepting unit 112 determines whether the speech is input while the speech input button 101a is being pressed (step S1005). In other words, the speech-input accepting unit 112 determines whether the input speech is the first speech or the second speech for the correction of the first speech.

If the speech is input while the speech input button 101a is being pressed (YES at step S1005), the first-candidate selecting unit 115a refers to the language models and selects the most probable word string as the recognition result of the first speech (step S1006). More specifically, the first-candidate selecting unit 115a picks two words from the word-string candidate group, acquires a pair of the words having the highest appearance probability by referring to the language models stored in the language-model storage unit 125, and selects the acquired pair of the words as the most probable words.

Next, the output control unit 118 displays the selected word string on the display unit 103 (step S1007). The user checks the word string on the display unit 103 and, if any correction is required, inputs the second speech while pressing the correcting-speech input button 101b. The second speech is accepted by the speech-input accepting unit 112, and word string candidates are produced (steps S1001 to S1004).

In this case, because the speech-input accepting unit 112 determines that the speech was input while the speech input button 101a is not being pressed (NO at step S1005), the second-candidate selecting unit 115b performs a correction-candidate selecting process to select the most probable word string from the word string candidates (step S1008). The correction-candidate selecting process will be explained later.

The correction-portion identifying unit 116 performs a correction-portion identifying process to identify a portion of the first speech to be corrected by the second speech (step S1009). The correction-portion identifying process will be explained later.

The correcting unit 117 corrects the correction portion identified at the correction-candidate selecting process (step S1010). The output control unit 118 then displays the correction word string on the display unit 103 (step S1011), and thus the speech recognition process terminates.

Figure 11:
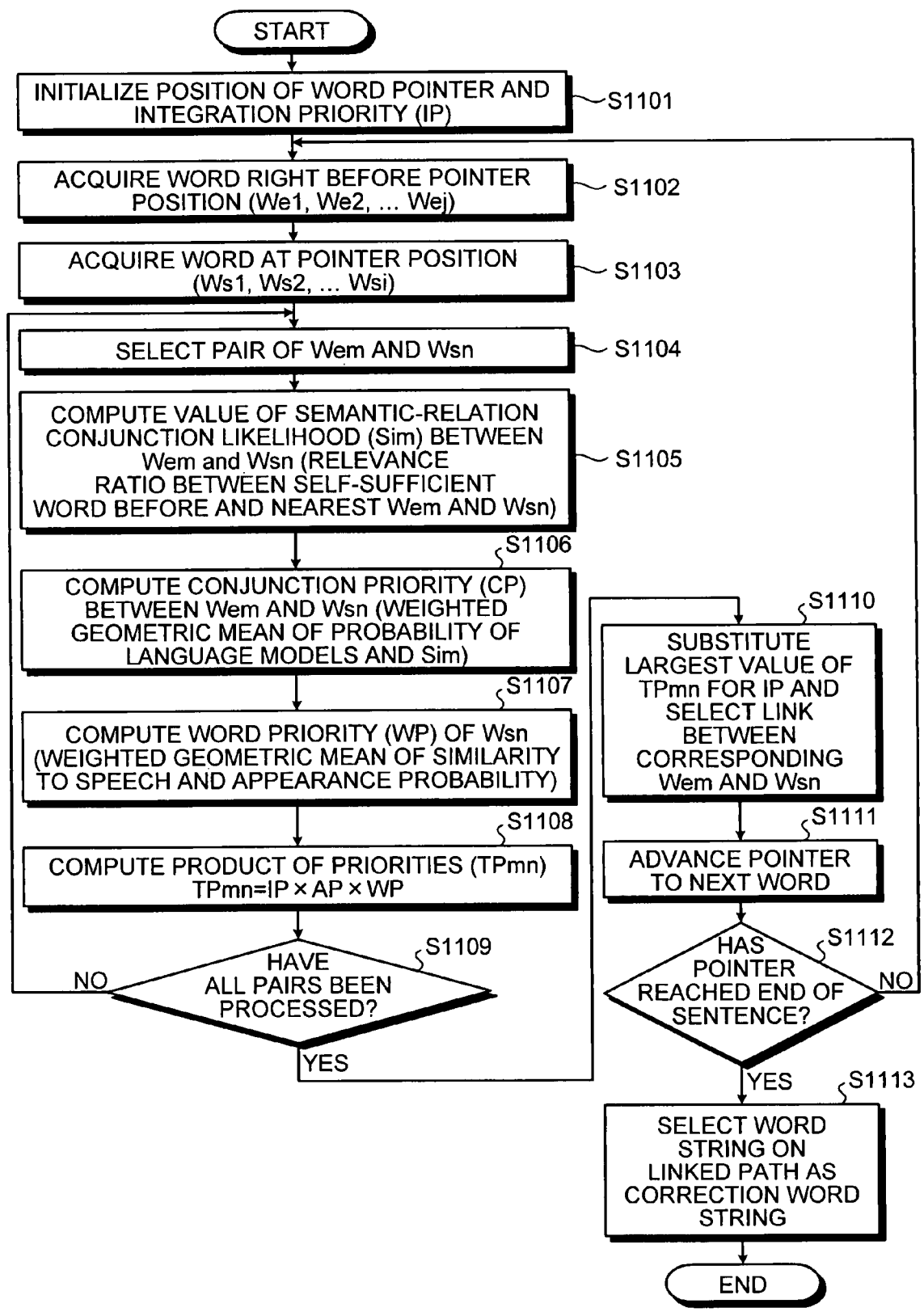
FIG. 11 is a flowchart of a correction-candidate selecting process.

Next, the correction-candidate selecting process at step S1008 will be explained in detail. FIG. 11 is a flowchart of an overall procedure in the correction-candidate selecting process. In FIG. 11, the word string candidates are selected herein using the Viterbi algorithm.

First, the second-candidate selecting unit 115b initializes a position of a word pointer and an integration priority (IP) (step S1101).

The position of the word pointer is a piece of information indicating the node position in a lattice structure as shown in FIG. 6, and herein the pointer position is initialized to the head node. The integration priority is the integrated value of the priority computed to select the most probable word string, and initialized herein to one.

The word extracting unit 119 acquires a word right before the pointer position (step S1102). Assuming that the number of word candidates right before the pointer position is j, the acquired words are indicated as We1, We2, . . . , Wej (j is an integer).

The word extracting unit 119 acquires a word at the pointer position (step S1103). Assuming that the number of word candidates at the pointer position is i, the acquired words are indicated as Ws1, Ws2, . . . , Wsi (i is an integer).

The second-candidate selecting unit 115b selects a pair of the Wem (m is an integer larger than zero and equal to or smaller than j) and the Wsn (n is an integer larger than zero and equal to or smaller than i) (step S1104), and performs the processes in steps S1105 to S1108.

The second-candidate selecting unit 115b computes a value of semantic-relation conjunction likelihood between the Wem and the Wsn (hereinafter, "Sim(Wsn,Wem)") (step S1105). The semantic-relation conjunction likelihood is a value indicating a relevance ratio between a self-sufficient word before and nearest the Wem and the Wsn (hereinafter, "$pre_k(Wem)$"), which is computed by the following equation (1)

$$Sim(Wsn, Wem) = \mathrm{argmax}_k(rel(Wsn, pre_k(Wem))) \quad (1)$$

The argmax( ) indicates a function that computes the maximum value of the numeric in the parentheses, and the rel (X,Y) indicates the relevance ratio of the semantic relation between the word X and the word Y. Whether the word is a self-sufficient word is determined by referring to an analysis dictionary (not shown) using a conventional technology of morphologic analysis and the like.

Next, the second-candidate selecting unit 115b computes a value of conjunction priority (CP) between the Wem and the Wsn (step S1106). The conjunction priority indicates a weighted geometric mean of the probability of language models of the Wem and the Wsn (hereinafter, "P(Wsn|Wem)") and the semantic-relation conjunction likelihood (hereinafter, "Sim"). The conjunction priority is computed by the following equation (2).

$$CP = P(Wsn|Wem)^\lambda \times Sim(Wsn, Wem)^{\lambda-1} \quad (0 \leq \lambda \leq 1) \quad (2)$$

The second-candidate selecting unit 115b computes a value of the word priority (WP) of the Wsn (step S1107). The word priority indicates the weighted geometric mean of the similarity to the speech (hereinafter, "SS(Wsn)") and the appearance probability of the Wsn (hereinafter, "AP(Wsn)"), which is computed by the following equation (3).

$$WP = SS(Wsn)^\mu \times AP(Wsn)^{\mu-1} \quad (0 \leq \mu \leq 1) \quad (3)$$

The second-candidate selecting unit 115b computes a product of the priorities IP, AP, and WP (hereinafter, "TPmn") based on the following equation (4) (step S1108).

$$TPmn = IP \times AP \times WP \quad (4)$$

The second-candidate selecting unit 115b determines whether all the pairs have been processed (step S1109). If not all the pairs have been processed (NO at step S1109), the second-candidate selecting unit 115b selects another pair and repeats the process (step S1104).

If all the pairs have been processed (YES at step S1109), the second-candidate selecting unit 115b substitutes the largest value within the computed TPmn values for the IP and selects a corresponding link between Wem and Wsn (step S1110).

When the nearest self-sufficient word is located before the Wem, the second-candidate selecting unit 115b selects a link to a self-sufficient word whose $rel(Wsn, pre_k(Wem))$ value is the largest.

The second-candidate selecting unit 115b then advances the pointer position to the next word (step S1111), and determines whether the pointer position reaches the end of the sentence (step S1112).

If the pointer position is not at the end of the sentence (NO at step S1112), the second-candidate selecting unit 115b repeats the process at the pointer position (step S1102).

If the pointer position is at the end of the sentence (YES at step S1112), the second-candidate selecting unit 115b selects the word string on the linked path as the most probable correction-word string (step S1113), and thus the correction-candidate selecting process terminates.

Figure 12:
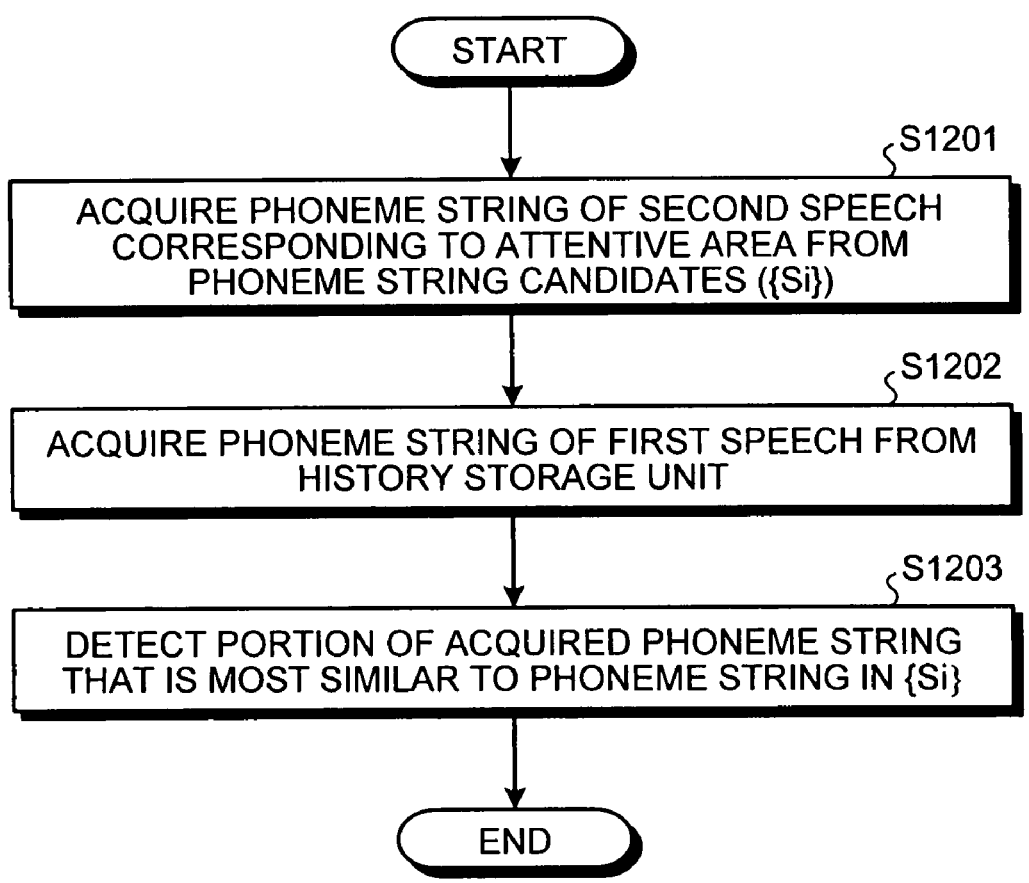
FIG. 12 is a flowchart of a correction-portion identifying process.

Next, the correction-portion identifying process at step S1009 will be explained in detail. FIG. 12 is a flowchart of an overall procedure in a correction-portion identifying process according to the first embodiment.

Fitst, the correction-portion identifying unit 116 acquires phoneme strings corresponding to the attentive area in the second speech from the phoneme string candidates (step S1201). A group of the acquired phoneme strings is referred to as {Si}.

The correction-portion identifying unit 116 acquires phoneme strings of the first speech from the history storage unit 123 (step S1202). The correction-portion identifying unit 116 detects a portion of the acquired phoneme string of the first speech that is the most similar to the phoneme string in the group of phoneme strings {Si} and then specifies it as the correction portion (step S1203).

Figure 13:
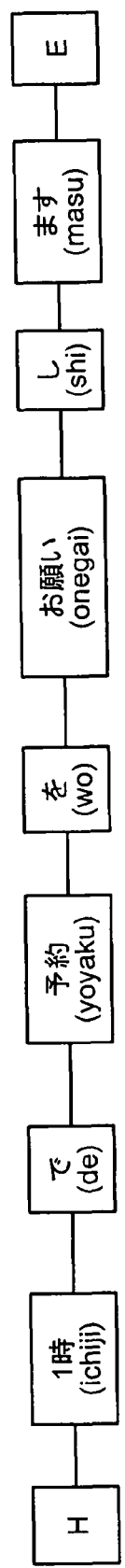
FIG. 13 is a view showing an example of a result of recognizing a first speech.
Figure 14:
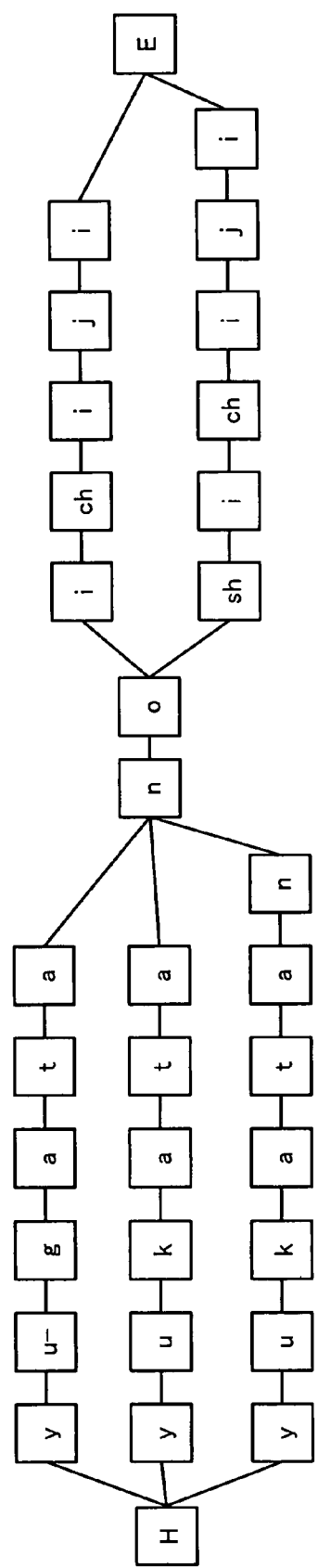
FIG. 14 is a view showing an example of phoneme-string candidate group for a second speech.
Figure 15:
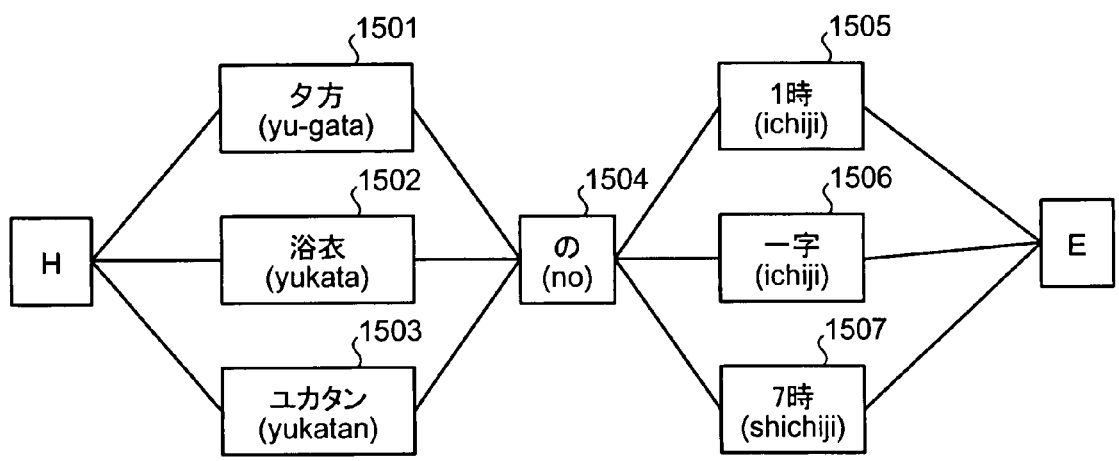
FIG. 15 is a view showing an example of word-string candidate group for the second speech.

Next, a specific example of the speech recognition process according to the first embodiment will be explained. FIG. 13 is a view showing an example of the result of recognizing the first speech. FIG. 14 is a view showing an example of the phoneme-string candidate group for the second speech. FIG. 15 is a view showing an example of the word-string candidate group for the second speech.

In the example shown in FIG. 13, the user vocalizes the first speech that means "please make a reservation at seven o'clock" in Japanese, and the sentence is incorrectly recognized as "please make a reservation at one o'clock".

The user speaks a Japanese phrase that means "seven o'clock in the evening" as the second speech to correct the first speech. In this example, the phoneme string candidates shown in FIG. 14 and the word string candidates shown in FIG. 15 are acquired.

When the tri-gram can be employed as the language model, three articulated words 1501 (yu-gata), 1504 (no), and 1507 (shichiji) that mean "seven o'clock in the evening" present high appearance probability. It is unlikely that the word 1502 that means a Japanese summer kimono or the word 1503 that means "Yukatan" (geographical name) in Mexico is used along with any of the words 1505 that means "one o'clock", 1506 that means "a single letter", and 1507 that means "seven o'clock".

In this manner, when the tri-gram can be used as the language model, an appropriate word-string candidate can be selected using the probability of the language model as in the conventional technology.

However, because the tri-gram involves a huge number of combinations, there are issues that the construction of the language models requires a huge amount of text data and that the data of the language models is very large. To take care of such issues, sometimes the bi-gram that articulates two words is used as the language model. When the bi-gram is used, it is not possible to narrow down the appropriate word strings from the word string candidates shown in FIG. 15.

On the other hand, according to the first embodiment, the appropriate word string can be selected using the thesaurus that expresses the semantic relation between the self-sufficient word right before a certain word and the certain word, such as the hierarchical relation, the partial-or-whole relation, the synonym relation, and the related-word relation.

Figure 16:
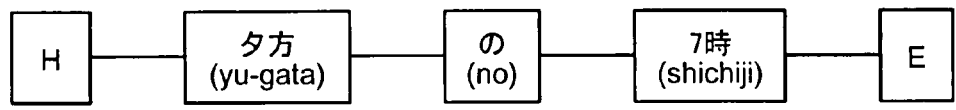
FIG. 16 is a view showing an example of a result of recognizing the second speech.

FIG. 16 is a view showing an example of the result of recognizing the second speech selected by the second-candidate selecting unit 115b in such a process.

After the recognition result of the second speech is selected as shown in FIG. 16, the correction-portion identifying unit 116 performs the correction-portion identifying process (step S1009).

Figure 17:
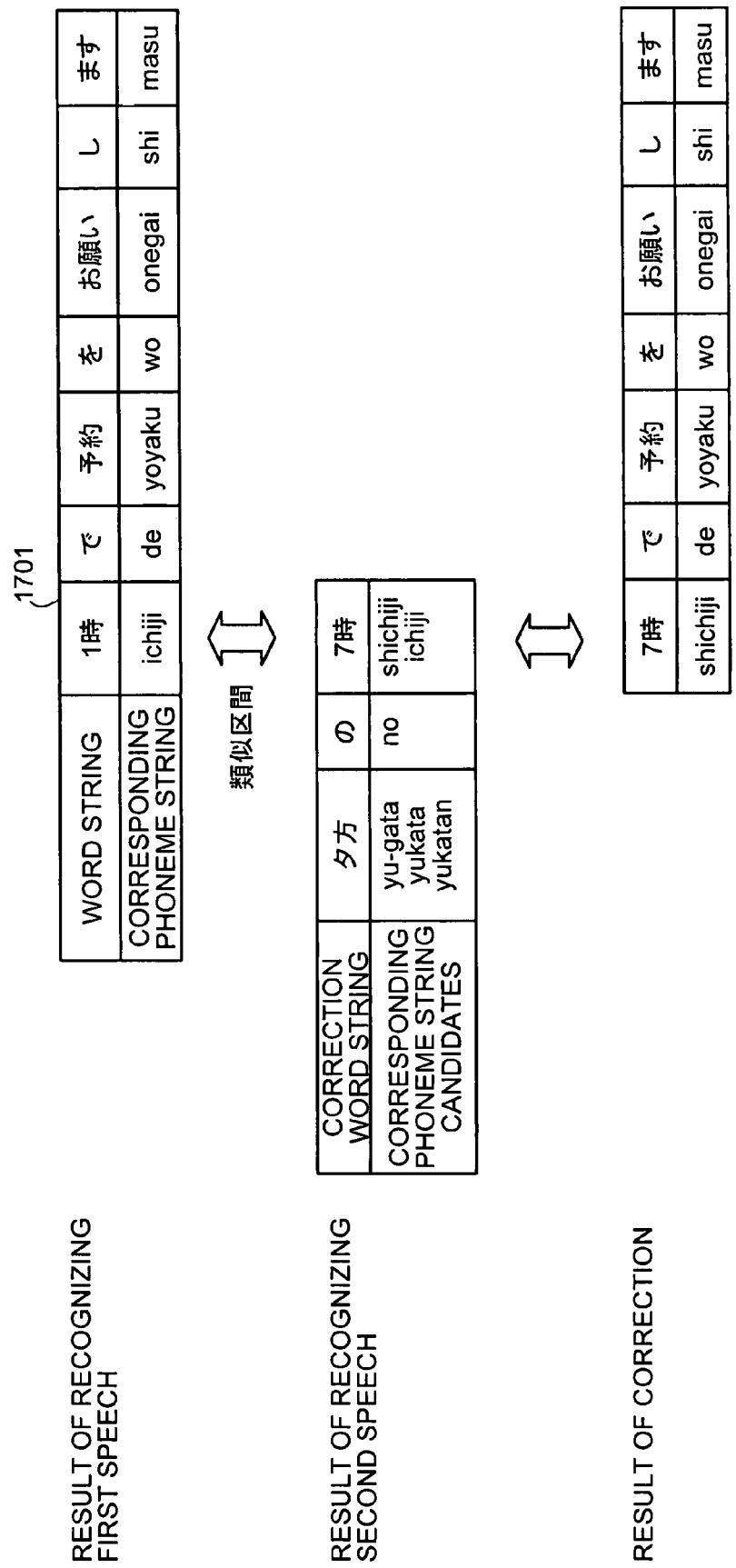
FIG. 17 is a view showing a schematic view for explaining the correction-portion identifying process.

FIG. 17 is a schematic view for explaining the correction-portion identifying process. The top portion in FIG. 17 includes word strings and phoneme strings that correspond to the first speech, the middle portion in FIG. 17 includes word strings and phoneme strings that correspond to the second speech, and the bottom portion in FIG. 17 includes correction results. While the link information in the word strings is omitted from the word strings in FIG. 17 for simplification, the word strings and correction word strings are actually configured as shown in FIGS. 13 and 16, and the phoneme strings and the phoneme string candidates are configured as shown in FIG. 5.

In the example shown in FIG. 17, "shichiji" and "ichiji" are acquired as the phoneme string candidates for the second speech corresponding to the attentive area (step S1201). By comparing the acquired phoneme string candidates with the phoneme string "ichiji-de-yoyaku-wo-onegai-shi-masu" that corresponds to the first speech, it is found that the phoneme string candidates correspond to "ichiji". This confirms that the word 1701 (ichiji) is the correction portion (step S1203).

The correcting unit 117 then performs the correcting process (step S1010). For the first speech, the Japanese sentence that means "please make a reservation at one o'clock" was incorrectly selected as the recognition result (see FIG. 13). However, as shown in FIG. 17, by replacing the word that means "one o'clock" with the word that means "seven o'clock" included in the attentive area of the correction word string that means "seven o'clock in the evening", the correct word string that means "please make a reservation at seven o'clock" is acquired.

While only the attentive area is replaced in this example, the correction portion identified by the correction-portion identifying unit 116 can be replaced by the whole correction word string. For example, in this case, the word that means "one o'clock" can be replaced by the correction word string that means "seven o'clock in the evening" to acquire a word string that means "please make a reservation at seven o'clock in the evening".

Figure 18:
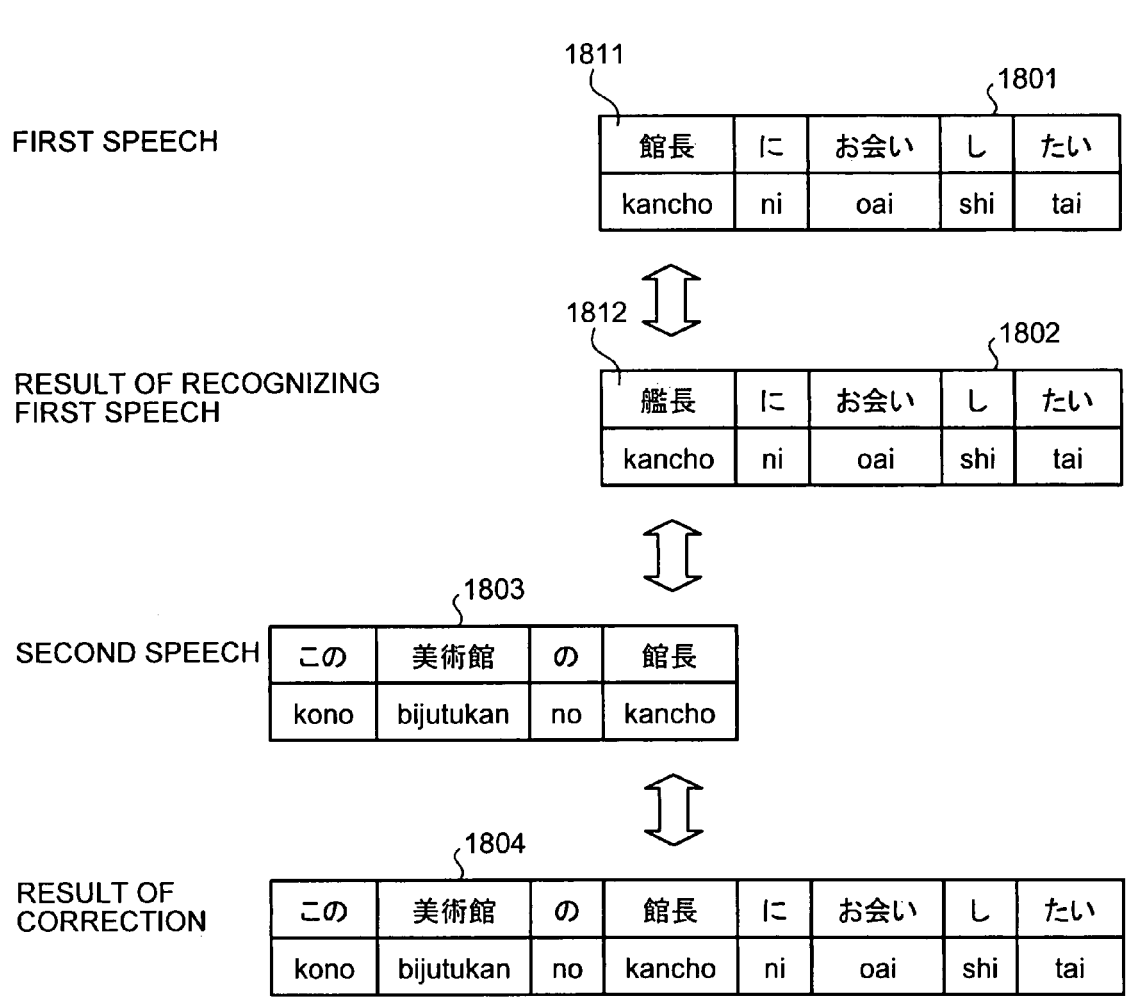
FIGS. 18 and 19 are views showing examples of an input data, an interim data, and an output data used in the speech recognition process.
Figure 19:
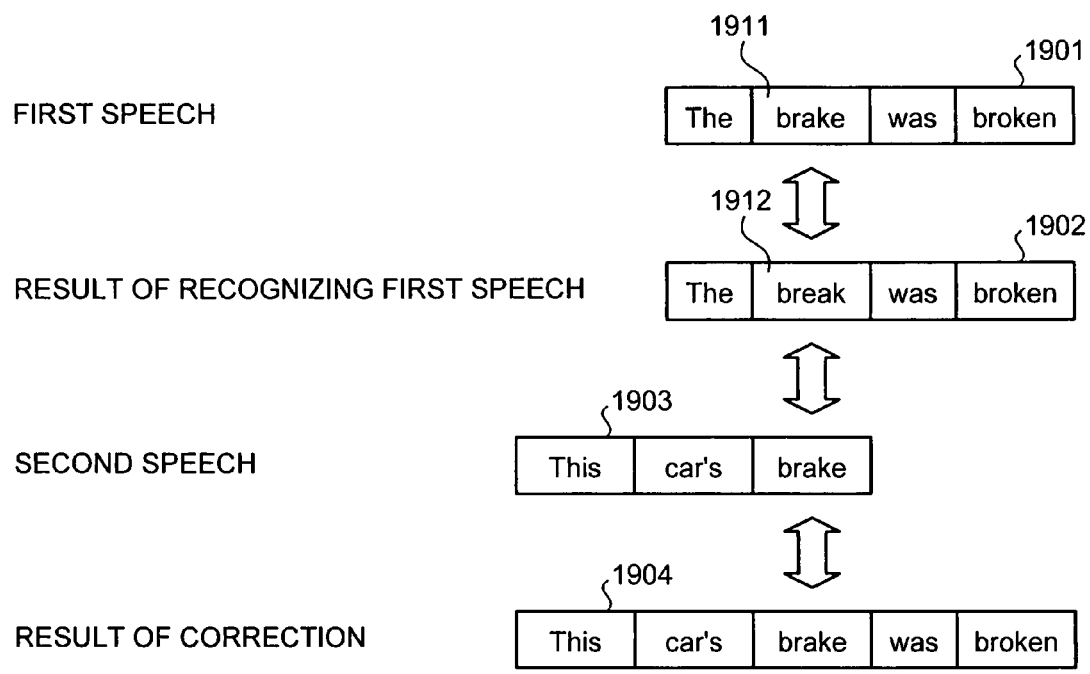

Next, another example of the speech recognition process according to the first embodiment will be explained. FIGS. 18 and 19 are views showing examples of an input data, an interim data, and an output data used in the speech recognition process.

In the example shown in FIG. 18, the user inputs a Japanese sentence 1801 that means "I want to meet the curator", and the recognition result 1802 is output. A word 1811 that means the curator is incorrectly recognized as a word 1812 that means a "sea captain".

When the user inputs a Japanese phrase 1803 that means the "curator of the museum", the word is correctly recognized and the recognition result 1804 is output.

In the example shown in FIG. 19, the user inputs an English sentence 1901 that means "the brake was broken", and a recognition result 1902 is output. A word 1911 that means "brake" is incorrectly recognized as a word 1912 that means "break".

When the user inputs an English phrase 1903 that means "this car's brake", the word in the correction portion is correctly recognized and the recognition result 1904 is output.

Next, a modified example according to the first embodiment will be explained. While the examples described above use the semantic relations such as the hierarchical relation, the partial-or-whole relation, the synonym relation, and the related-word relation, the speech recognition apparatus 100 can also use information of co-occurrence relation between words (hereinafter, "co-occurrence information"). The co-occurrence information means a numerical value of the probability that certain two words are used together (hereinafter, "co-occurrence probability").

For example, a word that means "tasty" and a word that means "coffee" are supposed to be frequently used together, and a word that means "hot" and the word that means "coffee" are also supposed to be frequently used together. The pairs have high co-occurrence probability. On the other hand, a word that means "sweltering" and the word that means "coffee" are supposed to be seldom used together, and therefore this pair has low co-occurrence probability.

Figures 20, 21:
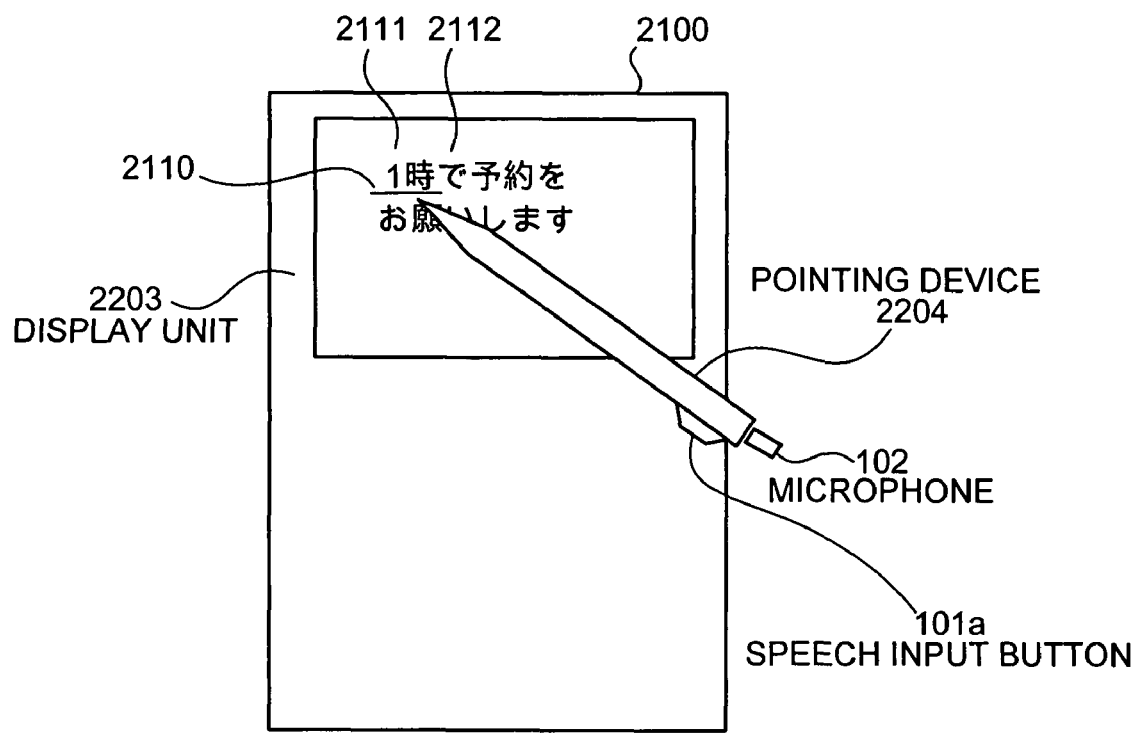
FIG. 20 is a view showing an example of relations between words based on co-occurrence information.
FIG. 21 is a view showing a schematic view of a speech recognition apparatus according to a second embodiment.

FIG. 20 is a view showing an example of relations between words based on the co-occurrence information. The co-occurrence probability of the pair of a first word that means "tasty" and a second word that means "coffee" is 0.7, which is higher than that of other pairs.

The co-occurrence information is acquired by analyzing a huge amount of text data and stored in the semantic-relation storage unit 124 in advance. The co-occurrence information can be used instead of the relevance ratio (rel) when the second-candidate selecting unit 115b selects candidates for the second speech.

As described above, the speech recognition apparatus according to the first embodiment recognizes the speech vocalized by the user for the correction of the incorrect recognition taking into account the semantically restricting information that the user adds to the correcting character string. In this manner, the correct word can be identified with reference to the semantic information even when the correct word has many synonyms and similarly pronounced words with increased accuracy of the speech recognition. This reduces load of correction on the user when the speech is incorrectly recognized.

A speech recognition apparatus according to a second embodiment uses a pointing device such as a pen to specify the correction portion.

FIG. 21 is a schematic view of a speech recognition apparatus 2100 according to the second embodiment. The speech recognition apparatus 2100 includes a pointing device 2204 and a display unit 2203. The display unit 2203 such as a display panel displays a character string corresponding to a word string as a recognition result of a speech input by a user.

The pointing device 2204 is used to indicate the character string and the like displayed on the display unit 2203, and includes the microphone 102 and the speech input button 101a. The microphone 102 accepts the voice of the user in the form of electrical signals. The speech input button 101a is pressed by the user to input speech.

The display unit 2203 further includes a function of accepting an input from the pointing device 2204 through the touch panel. A portion specified to be incorrect is marked with an underline 2110 or the like as shown in FIG. 21.

The second embodiment is different from the first embodiment in that the speech recognition apparatus 2100 does not include the correcting-speech input button 101b. Because a speech input just after the incorrect portion is specified by the pointing device 2204 is determined to be the second speech, the speech recognition apparatus 2100 requires only one button to input speeches.

Data of the speech input from the microphone 102 provide on the pointing device 2204 is transmitted to the speech recognition apparatus 2100 using a wireless communication system or the like that is not shown.

Figure 22:
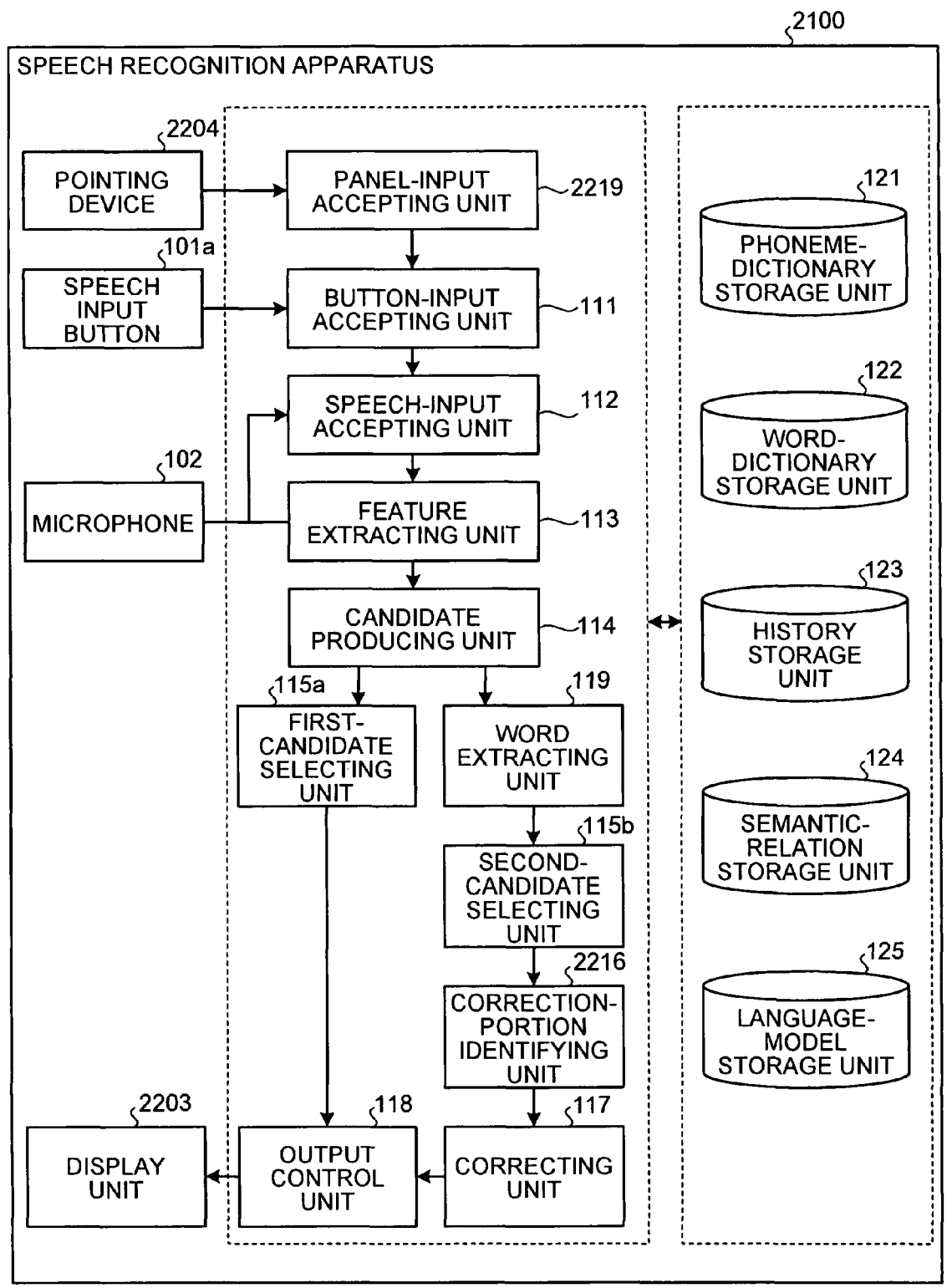
FIG. 22 is a block diagram of the speech recognition apparatus shown in FIG. 21.

FIG. 22 is a block diagram showing a constitution of the speech recognition apparatus 2100. As shown in FIG. 22, the speech recognition apparatus 2100 includes hardware such as the speech input button 101a, the microphone 102, the display unit 2203, the pointing device 2204, the phoneme-dictionary storage unit 121, the word-dictionary storage unit 122, the history storage unit 123, the semantic-relation storage unit 124, and the language-model storage unit 125.

Moreover, the speech recognition apparatus 2100 includes software such as the button-input accepting unit 111, the speech-input accepting unit 112, the feature extracting unit 113, the candidate producing unit 114, the first-candidate selecting unit 115a, the second-candidate selecting unit 115b, a correction-portion identifying unit 2216, the correcting unit 117, the output control unit 118, a word extracting unit 119, and a panel-input accepting unit 2219.

The software configuration according to the second embodiment is different from that of the first embodiment in that the panel-input accepting unit 2219 is added and that the correction-portion identifying unit 2216 functions differently from the correction-portion identifying unit 116. Because other units and functions are same as those shown in FIG. 2, the same reference numerals are assigned thereto and the explanations thereof are omitted.

The panel-input accepting unit 2219 accepts the specification of the incorrect portion input by the pointing device 2204 on the display unit 2203.

The correction-portion identifying unit 2216 identifies a correction portion on a character string of the first speech in the proximity of the portion specified by the pointing device 2204 to be corrected (correction-specified portion). The proximity of the correction-specified portion indicates a predetermined range either one or both of before and after the correction-specified portion.

While the correction-portion identifying unit 116 according to the first embodiment compares the second speech with all parts of the first speech to identify the correction portion, the correction-portion identifying unit 2216 according to the second embodiment identifies the correction portion in the minimum range by referring to the specification input by the pointing device 2204. This improves the processing speed and the search accuracy.

Figure 23:
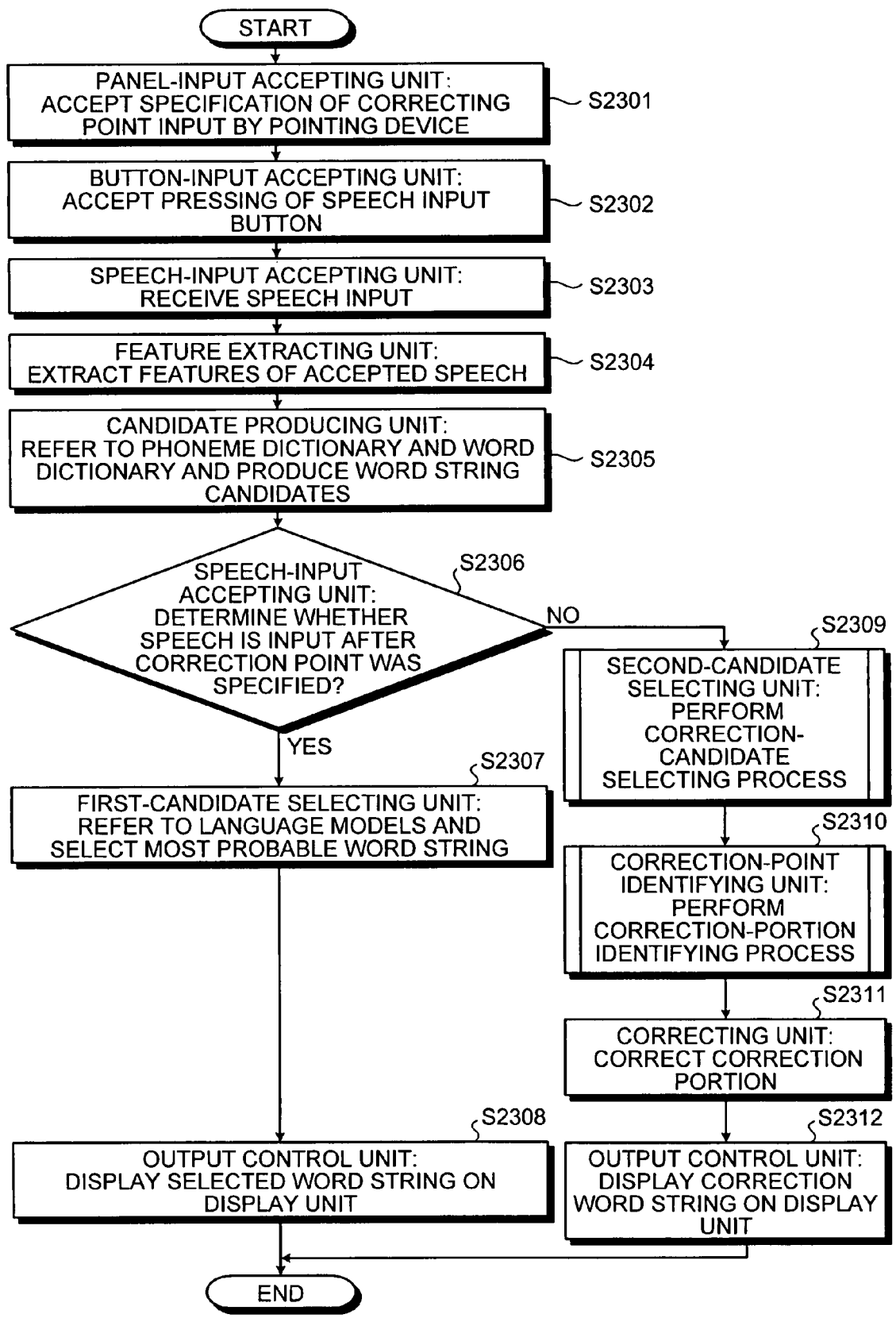
FIG. 23 is a flowchart of a speech recognition process according to the second embodiment.

The speech recognition process by the speech recognition apparatus 2100 according to the second embodiment will be explained. FIG. 23 is a flowchart of an overall procedure in a speech recognition process according to the second embodiment.

The panel-input accepting unit 2219 accepts the specification of the correction portion input by the pointing device 2204 (step S2301). The panel-input accepting unit 2219 accepts the input only when the second speech is to be input for correction.

The button-input accepting unit 111 accepts a pressing operation of the speech input button 101a (step S2302).

The process of accepting and recognizing the first speech and the process of outputting the recognition result in the steps S2303 to S2305 are the same processes as performed in the steps S1002 to S1004 in FIG. 10, and the explanation thereof is omitted here.

After the candidate producing unit 114 produces the candidates for the word string in the step S2305, the speech-input accepting unit 112 determines whether the input is performed after the specification of the correction portion was input (step S2306). The speech-input accepting unit 112 determines whether the input speech is the first speech or the second speech based on the result of the step S2306. More specifically, the speech-input accepting unit 112 determines that the speech is the second speech if it was input with the speech input button 101a pressed after the correction portion is specified by the pointing device 2204, and that the speech is the first speech otherwise.

The first-candidate selecting process, the output controlling process, and the second-candidate selecting process in the steps S2307 to S2309 are the same processes as performed in the steps S1006 to S1008 in FIG. 10, and the explanation thereof is omitted here.

After the recognition result of the second speech is selected in the step S2309, the correction-portion identifying unit 2216 performs the correction-portion identifying process (step S2310). The correction-portion identifying process will be explained in detail below.

The correction process and the recognition-result output process in the steps S2311 and S2312 are the same processes as performed in the steps S1010 and S1011 in FIG. 10, and the explanation thereof is omitted here.

Figure 24:
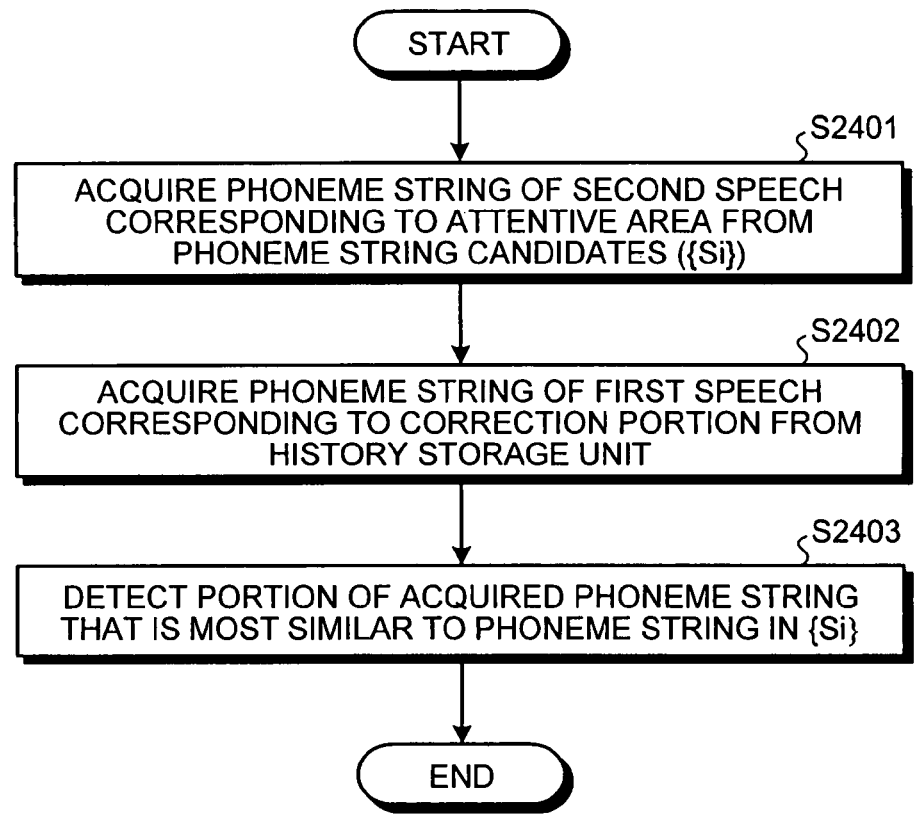
FIG. 24 is a flowchart of a correction-portion identifying process according to the second embodiment.

Next, the correction-portion identifying process in the step S2310 will be explained in detail. FIG. 24 is a flowchart of an overall procedure in the correction-portion identifying process according to the second embodiment.

The phoneme-string acquiring process in the step S2401 is the same process as performed in the step S1201 in FIG. 12, and the explanation thereof is omitted here.

After acquiring the phoneme string of the second speech corresponding to the attentive area from the phoneme string candidates in the step S2401, the correction-portion identifying unit 2216 acquires a phoneme string corresponding to the correction-specified portion or the proximity thereof in the first speech from the history storage unit 123 (step S2402).

In the example shown in FIG. 21, the correction-portion identifying unit 2216 acquires a phoneme string corresponding to a word 2111 that is included in the correction-specified portion marked with the underline 2110 and that means "one o'clock". Moreover, the correction-portion identifying unit 2216 acquires another phoneme string corresponding to a word 2112 in the proximity of the correction-specified portion.

The process of detecting the similar portion in the step S2403 is the same process as performed in the step S1203 in FIG. 12, and the explanation thereof is omitted here.

As described above, with the speech recognition apparatus according to the second embodiment, the correction portion can be specified using the pointing device such as a pen, and the correction portion can be identified in the proximity of the specified portion so that the identified portion is corrected. This ensures the correction of the incorrectly recognized speech without increasing an load on the user.

Figure 25:
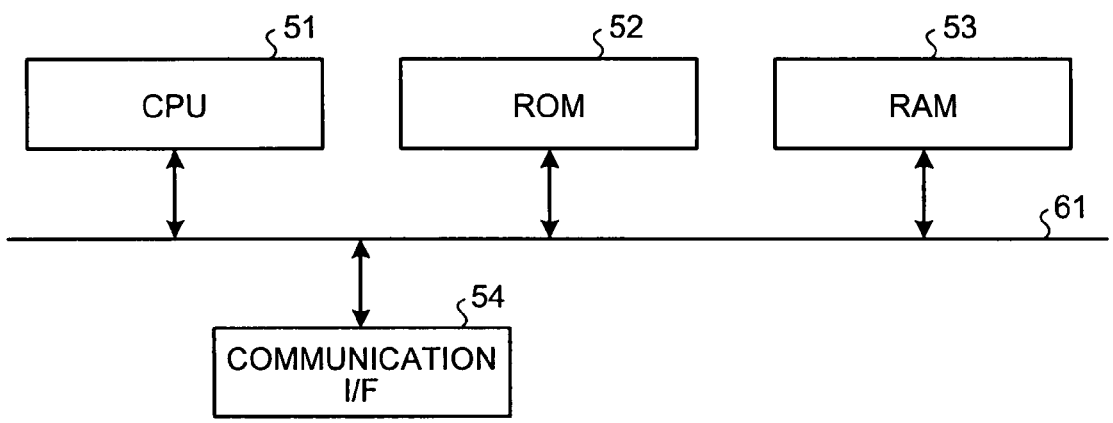
FIG. 25 is a block diagram of hardware in the speech recognition apparatus according to the first or second embodiment.

FIG. 25 is a block diagram of hardware in the speech recognition apparatus according to the first or second embodiment.

The speech recognition apparatus according to the first or second embodiment includes a control unit such as a central processing unit (CPU) 51, storage units such as a read only memory (ROM) 52 and a RAM 53, a communication interface (I/F) 54 connected to a network for communication, and a bus 61 that connects the units one another.

A speech recognition program executed on the speech recognition apparatus is stored in the ROM 52 or the like in advance.

The speech recognition program can also be recorded in a computer-readable recording medium such as a compact disk read only memory (CD-ROM), a flexible disk (FD), a compact disk recordable (CD-R), or a digital versatile disk (DVD) in an installable format or an executable format.

The speech recognition program can otherwise be stored in a computer connected to a network such as the Internet so that the program is available by downloading it via the network. The speech recognition program can be provided or distributed through the network such as the Internet.

The speech recognition program includes modules of the panel-input accepting unit, the button-input accepting unit, the speech-input accepting unit, the feature extracting unit, the candidate producing unit, the first-candidate selecting unit, the second-candidate selecting unit, a correction-portion identifying unit, the correcting unit, and the output control unit as mentioned above. The units are loaded and generated on a main storage unit by reading and performing the speech recognition program from the ROM 52 by the CPU 51.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A speech recognition apparatus comprising:
   a semantic-relation storage unit that stores semantic relation among words and relevance ratio indicating degree of the semantic relation in association with each other;
   a first input accepting unit that accepts an input of a first speech;
   a first candidate producing unit that recognizes the first speech and produces first recognition candidates and first likelihood of the first recognition candidates, the first recognition candidates containing a phoneme-string candidate and a word candidate;
   a first-candidate selecting unit that selects one of the first recognition candidates as a recognition result of the first speech based on the first likelihood of the first recognition candidates;
   a second input accepting unit that accepts an input of a second speech including an object word and a clue word, wherein the first speech includes the object word, the first speech does not include the clue word, and the recognition result of the first speech does not include the object word, and wherein the clue word provides the clue for recognizing the object word and for correcting a portion of the recognition result of the first speech which corresponds to the object word;
   a second candidate producing unit that recognizes the second speech and produces second recognition candidates and second likelihood of the second recognition candidates;
   a word extracting unit that extracts recognition candidates of the object word and recognition candidates of the clue word from the second recognition candidates;
   a second-candidate selecting unit that acquires the relevance ratio associated with the semantic relation between the extracted recognition candidates of the object word and the extracted recognition candidates of the clue word, from the semantic-relation storage unit, and selects one of the second recognition candidates as a recognition result of the second speech based on the acquired relevance ratio;

a correction-portion identifying unit that compares a phoneme-string contained in the recognition result of the first speech with a phoneme-string contained in the recognition candidates of the object word extracted by the word extracting unit, and identifies a portion corresponding to the object word; and a correcting unit that corrects the identified portion corresponding to the object word with a portion that contains the object word and that is contained in the recognition result of the second speech.

2. The speech recognition apparatus according to claim 1, wherein the recognition candidates of the object word include first words, the recognition candidates of the clue word include second words, and the second-candidate selecting unit selects a first word and a second word from the first words and the second words, respectively having the relevance ratio associated with the semantic relation between the first word and the second word being maximum, and selects the recognition result of the second speech that includes the selected first word and the selected second word.

3. The speech recognition apparatus according to claim 1, further comprising:

a language model storage unit that stores therein language models that associate a connection relation among words with degree of the connection relation, wherein the second-candidate selecting unit further acquires the degree of the connection relation associated with the connection relation between the extracted recognition candidates of the object word and the extracted recognition candidates of the clue word, and selects the recognition result of the second speech based on the acquired degree of the connection relation and the relevance ratio.

4. The speech recognition apparatus according to claim 1, wherein the second-candidate selecting unit selects the recognition result of the second speech based on the second likelihood of the second recognition candidates and the relevance ratio.

5. The speech recognition apparatus according to claim 1, further comprising:

a word-dictionary storage unit that stores words and an appearance probability of the words associated with each other, wherein the second-candidate selecting unit further acquires the appearance probability associated with the recognition candidates of the object word, and selects the recognition result of the second speech based on the acquired appearance probability and the relevance ratio.

6. The speech recognition apparatus according to claim 1, wherein the semantic-relation storage unit stores a hierarchical relation of semantic contents among the words and the relevance ratio associated with each other, and the second-candidate selecting unit acquires from the semantic-relation storage unit the relevance ratio associated with the hierarchical relation of semantic contents between the extracted recognition candidates of the object word and the extracted recognition candidates of the clue word, and selects the recognition result of the second speech based on the acquired relevance ratio.

7. The speech recognition apparatus according to claim 1, wherein the semantic-relation storage unit stores at least one of synonym relation and quasi-synonym relation among words as the semantic relation associated with the relevance ratio.

8. The speech recognition apparatus according to claim 1, wherein the semantic-relation storage unit stores a co-occurrence relation indicating that a plurality of words appear together and a co-occurrence probability indicating a probability of appearing the co-occurrence relation associated with each other, and the second-candidate selecting unit acquires from the semantic-relation storage unit the co-occurrence probability associated with the co-occurrence relation between the extracted recognition candidates of the object word and the extracted recognition candidates of the clue word, and selects the recognition result of the second speech based on the acquired co-occurrence probability.

9. The speech recognition apparatus according to claim 1, wherein the correcting unit corrects the identified portion corresponding to the object word with the word selected by the second-candidate selecting unit to the recognition candidates of the object word.

10. The speech recognition apparatus according to claim 1, wherein the correcting unit corrects the identified portion corresponding to the object word with the recognition result of the second speech selected by the second-candidate selecting unit.

11. The speech recognition apparatus according to claim 1, further comprising:

a display unit that displays the recognition result of the first speech; and a correction-portion specifying unit that specifies a correction portion in the recognition result of the first speech displayed on the display unit, wherein the correction-portion identifying unit identifies a portion corresponding to the object word in the first speech from a predetermined range at least one of before and after the specified correction portion.

12. The speech recognition apparatus according to claim 11, wherein the second input accepting unit accepts a speech input after the correction portion is specified as an input of the second speech.

13. The speech recognition apparatus according to claim 1, wherein the first input accepting unit accepts a speech input when a first button is pressed as the first speech, and the second input accepting unit accepts a speech input when a second button is pressed as the second speech.

14. The speech recognition apparatus of claim 1 further comprising a speech receiving device for receiving one of the first speech and the second speech.

15. The speech recognition apparatus of claim 1 further comprising an output device for outputting the recognition result.

16. The speech recognition apparatus of claim 15 wherein the output device is one of a visual output device and an audio output device.

17. The speech recognition apparatus of claim 1 further comprising a trigger device for one of triggering the first input accepting unit to accept the input of the first speech and triggering the second input accepting unit to accept the input of the second speech.

18. A speech recognition method executed by a processor, the method comprising:

accepting a first speech;

recognizing, by the processor, the accepted first speech to produce first recognition candidates and first likelihood of the first recognition candidates, the first recognition candidates containing a phoneme-string candidate and a word candidate;

selecting, by the processor, one of the first recognition candidates produced for a first speech as the recognition result of the first speech based on the first likelihood of the first recognition candidates;

accepting, by the processor, a second speech that includes an object word and a clue word, wherein the first speech includes the object word, the first speech does not include the clue word, and the recognition result of the first speech does not include the object word, and wherein the clue word provides the clue for recognizing the object word and for correcting a portion of the recognition result of the first speech which corresponds to the object word;

recognizing, by the processor, the accepted second speech to produce second recognition candidates and second likelihood of the second recognition candidates;

extracting, by the processor, recognition candidates of the object word and recognition candidates of the clue word from the produced second recognition candidates;

acquiring, by the processor, a relevance ratio associated with the semantic relation between the extracted recognition candidates of the object word and the extracted recognition candidates of the clue word from a semantic-relation storage unit that stores therein semantic relation among words and relevance ratio indicating degree of the semantic relation in association with each other;

selecting, by the processor, one of the second recognition candidates as the recognition result of the second speech based on the acquired relevance ratio;

comparing, by the processor, a phoneme-string contained in the recognition result of the first speech with a phoneme-string contained in the recognition candidates of the object word extracted by the word extracting unit;

identifying, by the processor, a portion corresponding to the object word in the first speech; and correcting, by the processor, the identified portion corresponding to the object word with a portion that contains the object word and that is contained in the recognition result of the second speech.

19. A computer program product having a non-transitory computer readable medium storing therein programmed instructions for recognizing speech, wherein the instructions, when executed by a computer, cause the computer to perform:

accepting a first speech;

recognizing the accepted first speech to produce first recognition candidates and first likelihood of the first recognition candidates, the first recognition candidates containing a phoneme-string candidate and a word candidate;

selecting one of the first recognition candidates produced for a first speech as the recognition result of the first speech based on the first likelihood of the first recognition candidates;

accepting a second speech that includes an object word and a clue word, wherein the first speech includes the object word, the first speech does not include the clue word, and the recognition result of the first speech does not include the object word, and wherein the clue word provides the clue for recognizing the object word and for correcting a portion of the recognition result of the first speech which corresponds to the object word;

recognizing the accepted second speech to produce second recognition candidates and second likelihood of the second recognition candidates;

extracting recognition candidates of the object word and recognition candidates of the clue word from the produced second recognition candidates;

acquiring a relevance ratio associated with the semantic relation between the extracted recognition candidates of the object word and the extracted recognition candidates of the clue word from a semantic-relation storage unit that stores therein semantic relation among words and relevance ratio indicating degree of the semantic relation in association with each other;

selecting one of the second recognition candidates as the recognition result of the second speech based on the acquired relevance ratio;

comparing a phoneme-string contained in the recognition result of the first speech with a phoneme-string contained in the recognition candidates of the object word extracted by the word extracting unit;

identifying a portion corresponding to the object word in the first speech; and correcting the identified portion corresponding to the object word with a portion that contains the object word and that is contained in the recognition result of the second speech.

* * * * *